United States Patent [19]
Olson

[11] Patent Number: 5,954,295
[45] Date of Patent: Sep. 21, 1999

[54] LIFT GENERATION BY COUNTER-ROTATING LINE VORTICES

[76] Inventor: Virgil Dale Olson, P.O. Box 1006, Campbell, Calif. 95009-1006

[21] Appl. No.: 09/024,749

[22] Filed: Feb. 17, 1998

[51] Int. Cl.[6] .................................................. B64C 29/00
[52] U.S. Cl. ................................ 244/9; 244/19; 244/21; 416/178
[58] Field of Search .................................. 244/9, 10, 19, 244/20, 21; 416/178

[56] References Cited

U.S. PATENT DOCUMENTS

| | | | |
|---|---|---|---|
| 1,237,318 | 8/1917 | Flink | 244/9 |
| 1,529,869 | 3/1925 | Burril | 244/19 |
| 1,631,861 | 6/1927 | Nee Sachs | 244/9 |
| 1,761,053 | 6/1930 | Rystedt | 244/9 |

FOREIGN PATENT DOCUMENTS

| 1481946 | 6/1969 | Germany | 244/19 |
|---|---|---|---|

*Primary Examiner*—Galen L. Barefoot

[57] ABSTRACT

A mechanism and method for generating lift with the Bernoulli Effect. A pair of cylindrical impellers create a pair of counter rotating forced linear vortices. Fast moving, low pressure air surrounding the forced vortices comes into contact with the upper sides of semicylindrical lifting surfaces. Higher pressure, slower moving air is in contact with the lower sides of the lifting surfaces. The velocity differentials between the upper and lower sides of the lifting surfaces cause a pressure differential that produces lift.

4 Claims, 31 Drawing Sheets

LIFT GENERATION BY COUNTER-ROTATING LINE VORTICES

BACKGROUND—FIELD OF INVENTION

This invention relates to aircraft, specifically to a method and apparatus for using side-by-side counter-rotating line vortices to generating lift by the Bernoulli Effect.

BACKGROUND

Aircraft can fly because of a net upward force exerted by air against their lifting surfaces. That net upward force is generated by the Bernoulli Effect.

A body of air in motion is under less pressure than a body of air that is still. Additionally, the faster a body of air moves the less pressure it feels. That phenomenon is known as the Bernoulli Effect.

An air stream or air flow is defined as a body of air in motion.

Vectors

The velocity of a body in motion is always calculated relative to some other body. In this case the velocity of the body of air in question is calculated relative to the body of air surrounding it.

Velocity, pressure and force are vectors. Vectors are numbers with a magnitudes as well as direction. Pressure is expressed as force per unit area. The total force acting on acting on a surface is pressure per unit area multiplied times the surfaces area. For instance, if the pressure acting on a flat surface is 1 pound per square inch and the surface has an area of 2 square inches it the force acting on the surface would be 2 pounds.

Force=pressure×area

Force=(1 pound/1 square inch)×1 square inch=1 pound

The force acting on each 1 square inch area can be represented as a vector. When two vectors are added together the total is called the resultant. Those vectors representing the force acting on each square inch can be added together to yield the total force acting on the surface. The direction of the force resultant is perpendicular to the surface and in the same direction as of the pressure resultant. The resultant's magnitude or size is 2 pounds. The units of the vector are in pounds.

Static Pressures

To keep the descriptions simple, the entities discussed here are all at sea level. Parallel descriptions can be constructed for other altitudes.

A body of air at rest relative to the surrounding air feels a pressure of 1 atmosphere (atm). One atmosphere is the same or equivalent to the following:

1 atm=14.7 pounds per square inch (lb./sq. in)

1 atm=2117 pounds per square foot (lb./sq. ft.)

A surface immersed in and at rest relative to a body of still air also experiences a pressure of 1 atm. If a planar surface is oriented so that it is horizontal, it will feel a pressure of 2117 lb./sq. ft. pushing downward on its upper side and will feel a pressure of 2117 lb./sq. ft. pushing upward on its lower side. The forces that those pressures generate cancel out leaving no net force acting on that surface.

Aerodynamic Pressures

A point is embedded within a air stream has the same velocity as the air stream. That point will inscribe a line through space as it travels with the body of air. That inscribed line is defined as a streamline.

Due to friction, air in contact with a surface always has the same velocity as that surface. That thin body of air in contact with the surface is called a boundary layer. If an air stream is moving or translating past a flat surface and the flat surface is oriented parallel to the stream lines of that translating body of air, its boundary layer is in motion relative to that airstream. As a result the boundary layer will experience a reduced pressure relative to the surrounding body of air. That reduced pressure will be transmitted to the surface.

If a flat surface is oriented horizontally and is immersed in an air stream moving horizontally at 200 m.p.h. the surface, the boundary layers will feel a pressure of 9/10 atm. Since the surface is in contact with the boundary layer it will also feel a pressure of 9/10 atm. The pressure pushing downward on its upper side will be 1905 lb./sq. ft. and the pressure pushing upward on its lower side will be 1905 lb./sq. ft. Again, the effects of the pressures cancel out so that the surface feels no net force acting in an up or down direction.

Types of Air Flows

When the sub-layers within a transition layer flow past each other smoothly they are called laminar air flows.

Between the boundary layer surrounding a surface and a passing body of air exists a transition layer. That transition layer contains sub-layers. The velocity of the sub-layers relative to the passing body of air decreases with increasing distance from that surface until the velocity of the outer most sub-layers become the same as that passing air stream. Also, the closer a transition sub-layer is to the surface the higher its velocity relative to the passing airstream and the lower the pressure sub-layer experiences.

The transition layers because of the graduated velocities of their sub-layers are powerful amplifiers. They amplify tiny movement irregularities in air flowing past a surface and its boundary layer. Those amplified irregularities are call turbulence. The air flows containing the turbulence are called turbulent air flows. The effects of turbulent air flows can be ignored for now.

Drag

There is one force that the above surface would feel however. The passing air stream pulls on the surface as it passes. The force acting on that surface is called drag. Any body in contact with a passing airstream will feel such a force. Drag is vector. It is a forced that is directed parallel to the velocity of the passing air stream.

The Wing

If the upper side of a surface is made to be convex while the lower side of the surface remains flat and the distance from front to back is 10% longer over the top than the bottom, air moving near to the upper and lower surfaces will move 10% faster over the top than over the bottom. If the surface is immersed in a large body of air moving past the above surface at 200 m.p.h., the air near to the upper surface will move 10% faster than the air moving past the lower surface. The upper surface would feels a pressure of about 0.89 atm while the lower surface feels a pressure of 0.9 atm. The pressures acting on the surface do not cancel out and there would be an upward pressure of 0.01 atm or 21 lb./sq. ft. That upward pressure is called the lift factor. The amount of upward force acting on a surface is called lift. All wings have similar shapes and when moving through the air at 200 m.p.h. produce similar lift factors.

Generalized Lifting Surfaces

Any object experiencing an air flow asymmetry between its uppermost surface and its lowermost surface experiences a force acting perpendicular to the direction of the air stream.

A surface designed to generate lift is defined as a lifting surface.

The larger the air flow asymmetry around a lifting surface the larger the amount of lift it generates.

A surface with an airstream moving 200 m.p.h. past its upper side and with still air in contact with its lower side experiences a lift factor of 1/10 atm or 212 lb./sq. ft. That is a lift factor that is roughly 10 times that of the wing.

In order to efficiently generate lift with the Bernoulli Effect, the air flows need to move parallel to the surfaces they are interacting with. If the surfaces have a curvatures the air flows ideally should move parallel to the tangents of those curvatures at every point.

Wing Limitations

Wings do not produce very large lift factors because they can not produce very large air flow asymmetries. In order to increase the air flow asymmetry around a wing, the top of it must be made more convex. However, if the upper surface becomes too convex, a point of diminishing returns is reached. The air flow will separates from the surface before it reaches the trailing edge. That leaves a lower velocity air stream in contact with part of the upper surface boundary layer. That separation of passing air stream from the boundary layer when curvatures becomes too large prevents air flow asymmetries form being enhanced beyond a certain point.

Forces generated by the Bernoulli Effect are directed perpendicularly to surfaces experiencing air flows moving past them.

Vortices

The Bernoulli Effect is produced not only by bodies of air moving in straight lines but also by bodies of air that are rotating.

Tornados are examples of rotating bodies of air. Air is a fluid. A rotating body of fluid is called a vortex (the plural of vortex is vortices).

Vortex Structure

Physical vortices have an internal structure. They have an axis at their center around which they rotate. If the axis of a vortex does not connect with itself to form a ring, the vortex is called the line vortex. Around that axis is a cylindrical body of fluid that rotates as solid body because of viscosity effects or friction. That part of a vortex that rotates as a solid body is called a core. Points within the core all take the same amount of time to rotate around the vortex axis. The velocity, V, of a point within that core is directly proportional to its distance, r, from the axis.

$$V \propto r$$

Outside of the core is another cylindrical body of fluid that is concentric to the core. The velocity, V, of a point within that portion of the vortex varies inversely as its distance, r, from the vortex axis.

$$V \propto \frac{1}{r}$$

Forced and Natural Vortices

Rotating bodies of fluid that rotate as a solid body behave like the core of a vortex are defined as forced vortices. Rotating bodies of fluid that behave like the outer portion of the vortex are defined natural vortices. The interface between the forced and natural portions of the vortices is the point where the velocities are the highest. That is also the region where the Bernoulli Effect is the most pronounced and the pressures are approaching the minimum for the vortex. The pressures in the forced vortex decline further as the center of the forced vortex is approached because of the action of centrifugal force on the rotating gases in the vortex core.

Vortex Extent

It is important to note that the natural portion of a vortex, in theory, extends to infinity. The core of a vortex and the natural part of the vortex near to the core produce the most pronounced effects but those portions only represent a small part of the complete vortex.

The at the interface between the core and the natural vortex portions of tornado the air velocities often reach 200 m.p.h. The pressure at that interface is about 9/10 atm.

Impellers for Making Forced Vortices

A forced vortex can be created within a cylindrical rotor or impeller. Such a impeller has an axis of rotation. A drive shaft with an axis oriented colinearly with the impeller axis of rotation holds a pair of equal pluralities of radial spokes. The spokes, mounted perpendicularly and symmetrically around the drive shaft, are of equal length. Mounted parallel to the impeller axis of rotation on the outer ends of the spokes are identical impeller blades. A impeller blade is defined as a long, narrow, rigid, rectangular piece of material. The widths of the impeller blades are oriented radially to the axis of rotation. The center of the impeller is hollow except for the drive shaft and the spokes supporting the impeller blades. Such an apparatus is defined as a impeller or cylindrical impeller.

In turning the impeller, the impeller blades push and pull the air around the periphery of the volume enclosed by the impeller. Friction or drag between elements of the enclosed volume of air cause relative motions to damp out and the enclosed body of air to all rotate with the same angular velocity, rotate as a solid body or forced vortex. The forced vortex is said to be embedded in the impeller.

The outer surface of the volume swept out by the impeller blades is defined as the surface of the forced vortex.

Vortex Seals

In order to prevent the embedded air in the forced vortex from being thrown out of the impeller by the action of centrifugal force, circular surfaces perpendicular the impeller axis of rotation are situated near each end of the impeller. Such surfaces prevent the inflow of air along the impeller axis of rotation. The circular surfaces have a slightly larger diameter than the impeller. The the forced vortex is said to terminate on the circular surfaces. The circular surfaces that the forced vortex terminates on are defined as vortex seals.

Forced Vortex Pressures

A forced vortex three feet in diameter rotating at 1868 revolutions per minute (r.p.m.) duplicates the conditions at the of the core of a tornado. The surface of the forced vortex has a velocity of 200 m.p.h. and has a pressure of 9/10 atm. It is also surrounded by a natural vortex that, in theory, extends to infinity. That natural vortex surrounding the forced vortex has important implications.

Half Cylinder Lifting Surfaces

The surface of the forced vortex has thin layer of air surrounding it that rotates at the same rate as the forced vortex. If a concentric half-cylinder closely encases the lower half of the forced vortex, the upper side of the half-cylinder would have air moving 200 miles per hour past the upper surface and its boundary layer. That boundary layer would experience a pressure of 9/10 atm which would be transmitted to the upper surface. If still air at 1 atm were in contact with the lower surface, the half cylinder would feel an upward pressure of 1/10 atm acting everywhere perpendicularly to that surface toward the forced vortex axis.

The half cylinder can be thought of as consisting of a large number of small flat areas. The force acting on each area would due to the pressure differential would be a vector directed at the axis of the half cylinder. All those vectors can be added together to yield a single resultant. That resultant would be a vector directed from the center of the half cylindrical surface toward its axis. Its magnitude would be:

Force=pressure×width of cylinder×length of cylinder

If the pressure is 211 lb/sq in, the width of the cylinder is 3 feet and the length is 6 feet, the force acting on the half cylinder would be:

Force=(211 lb/sq ft)×(3 ft)×(6 ft)=3798 lb

The half cylinder surface has low pressure high velocity air above its upper side and high pressure low velocity air below its lower side so the force it is experiences is directed upward. The half cylinder experiences 3798 lb of lift. Such a half-cylinder surfaces are defined as a lifting surfaces. An aircraft having a pair of lifting surfaces 3 feet in diameter by six feet long such as the one discussed above long generates a total lifting force of 7596 pounds.

Air Guides and Air Knives

If the forced vortex in the example above is surrounded by the natural vortex that ordinarily accompanies it, the air in that natural vortex would sweep around to the underside of the half cylinder surface. That would greatly reduced the air velocity asymmetry experienced by that surface and thus reduce the lift produced by it. In order to protect the underside of the lifting surface, the air in the natural vortex that doesn't fit between the impeller and the lifting surface must be guided away from the underside of lifting surface.

That is done by attaching the upper edge of a rectangular surface, that has the same length as the lifting surface, to the edge of the lifting surface experiencing the downward moving air of the natural vortex. The rectangular surface attaches so that it is substantially tangent to that edge. The rectangular surfaces guide the air downward and away from the underside of the half cylinder surface. Those rectangular surfaces are defined as air guides. The intersection between each lifting surface and the air guide are defined as the air knife.

Torques

Newton's Third Law says: for every action there is an equal and opposite reaction.

A torque is defined as a twisting force. Because torque is a force, it is a vector. In order to rotate one of the above impellers a torque is applied to it by a powerplant. The powerplant experiences a torque that has exactly the same magnitude but is opposite in direction. That opposing torque, which is defined as a reactive torque, arises as a result of Newton's Third Law.

A powerplant attached to an aircraft incorporating the above impeller, passes the torque to the airframe of that aircraft. The torque, that is passed to the airframe, causes the aircraft to feel a twisting force in the opposite direction as the impeller. To cancel out the reactive torque generated by the action of turning the impeller an aircraft using the above lift mechanism and process that is the subject of this invention has two impellers. The axis of the impellers are substantially parallel and that rotate around their respective axes in opposite directions. The torques are equal in magnitude but opposite in direction. The resultant of the two torques has a magnitude of zero. The reactive torques cancel themselves out. That leaves the airframe of the aircraft of employing this invention with no net torques acting on it due to the operation of the impellers.

Lifting Surface Orientation

Notice that an aircraft with those lifting surfaces would have to be hovering or standing still. Such lifting surfaces and impeller mechanisms can be at rest relative to the surrounding air and still generate lift for an aircraft that incorporates them.

The axes of the impellers for an aircraft employing them to generate lift are parallel to its direction of travel. The stream lines of the forced vortices generated by the impellers are perpendicular to the craft's direction of travel.

Notice that, when in forward motion, the aircraft still has a huge air flow asymmetry over its lifting surfaces when compared with the wing and thus the lifting surfaces would retain their large lift factors when compared to the wing.

Imaginary Descriptive Planes

Aircraft have bilateral symmetry. That means that left half of an aircraft is the mirror image of the right half. An imaginary plant can be constructed dividing the left half of an aircraft from the right half. Such a plane will be defined as the plane of bilateral symmetry.

An aircraft incorporating a life mechanism based on the forced vortices also has a bilateral plane of symmetry. The center lines of the lifting surfaces are parallel to that plane of bilateral symmetry with the plane of bilateral symmetry evenly dividing the space between them. The axes of the impellers are parallel to each other as well and are coincident with the center lines of the lifting surfaces.

A pair of parallel lines, such as the center lines of the lifting surfaces, determine a plane. The imaginary plane determined by the center lines of the lifting surfaces is defined as the plane of center lines. The plane of bilateral symmetry for an aircraft using forced vortices to generate lift is perpendicular to the plane of center lines.

The front edges of both lifting surfaces lie on an imaginary plane defined as the front terminal plane. The intersections of the front terminal plane with the lifting surfaces are semi-circles.

The rear edges of the lifting surfaces also lie on an imaginary plane. That plane is defined as the rear terminal plane. The intersections of the lifting surfaces with the rear terminal plane are substantially semicircular.

Both the front terminal plane and the rear terminal plane is perpendicular to the both the plane of bilateral symmetry and the plane of center lines.

The lifting surfaces have lateral edges. The lateral edges closest to the bilateral plane of symmetry are defined as the proximal edges. The lateral edges furthest from the bilateral plane of symmetry are defined as the distal edges. The proximal edge and the distal edge of each lifting surface are parallel to each other.

Looking at a craft from the front that depends forced vortices to produce lift, the bilateral plane of symmetry is parallel to the observers line of sight. The lifting surface lying to the left of the bilateral plane of symmetry is defined as the left lifting surface. The lifting surface lying to the right of the bilateral plane of symmetry is defined to be the right lifting surface.

The distal and proximal edges of each lifting surface are parallel and thus determine plane. The plane determined by the lateral edges of the left lifting surface is defined as the left dihedral plane. The plane defined by the lateral edges of the right lifting surface is defined as the right dihedral plane.

Dihedral Angles

The angle between a dihedral plane and the plane of center lines is defined as the dihedral angle. The angle between the left dihedral plane and the plane of center lines is defined as the left dihedral angle and has a value of delta.

The angle between the right dihedral plane and the plane of center lines is defined as the right dihedral angle and has a value of −delta. The left and right dihedral angles are equal magnitude and opposite in direction. The left dihedral angle is measured in a counter-clockwise direction while the right dihedral angle is measured in a clockwise direction. Both dihedral angles are measured from the plane of center lines toward the dihedral plane.

Looking at a craft from the front that depends forced vortices to produce life, the impeller and forced vortex lying to the left of the bilateral plane of symmetry is defined as the left impeller and left forced vortex. The impeller and the forced vortex lying to the right of the bilateral plane of symmetry is defined as the right impeller and right forced vortex.

The left impeller and the generated left forced vortex rotates in a counter-clockwise direction while the right impeller and the generated right forced vortex rotates in a clockwise direction.

When the surface of a forced vortex rotates past the distal edge of the lifting surface it enters the volume enclosed by the half cylinder lifting surface. When the forced vortex rotates past the proximal edge of the lifting surface it exits the volume enclosed by the half cylinder lifting surface.

Turbulence in Transition Layers

Any surface has boundary and a transition layers when a body of air is flowing past it. That is true of the half cylinder lifting surfaces with the forced vortices rotating past them as well. The transition layers created by a forced vortices rotating past their respective half cylinder lifting surface are defined as extending between a half cylinder lifting surface and its respective forced vortex.

The transition sub-layers moving past each other amplify tine air flow fluctuations occurring within those transition layers to produce turbulence. As the surface of a forced vortex rotates past the distal edge of its respective lifting surface turbulence builds in the transition layer lying between it and the lifting surface.

Reducing Drag with Turbulent Air Flows

Turbulent air flows move more easily past surface than laminar air flows. Making air flowing past the lifting surfaces turbulent helps the efficiency of lift generation. By carefully roughening the upper sides of the lifting surfaces air flowing past them can take place more easily.

Prevention of Turbulence Buildup

Once the surfaces of the forced vortices clear the proximal edges of its lifting surface, it drags turbulent air with it. Repeatedly dragging that turbulent air past the lifting surface causes the turbulence to grow to such a magnitude that it could be destructive to the impellers and lifting surfaces. In order to prevent that destruction, air is removed from the axial regions of the forced vortices. Withdrawing air from the central regions of the forced vortex causes the surface of the forced vortex to sink inward as well as the turbulent air surrounding it. The turbulent air drawn inward is replace by air flows having a smoother more laminar motion originating in the nature vortex region lying outside the forced vortex. The turbulent air only moves inward between the time it passes the proximal edge of the lifting surface and the time it passes the distal edge of the lifting surface.

Air is drawn out the axial region of each forced vortex through an orifice in the rear vortex seal that is concentric to the axis of each impeller. Mounted to each orifice is the intake is the gas turbine. Each turbine both turns the impeller and the withdraws air out of the center of the forced vortex created by the impeller.

Air withdrawn from the forced vortices is used to help produce the thrust to needed to drive the aircraft forward through the air.

Efficiency in Lift Generation

Though an aircraft employing forced vortices to generate lift depends on the Bernoulli Effect to do so, it still must satisfy Newton's Law:

$$F=ma$$

In order to generate a lifting force, the lifting apparatus accelerates the surrounding masses of air downward; it imparts downward momentum to the air.

The lifting apparatus creates extensive natural vortices around the aircraft. The bodies of air in the natural vortices are sheared off when they are moving in a downward direction.

A practical aircraft must produces lift efficiently. An aircraft producing lift by imparting an amount downward momentum to a large body of air is more efficient than an aircraft imparting the same amount of momentum to a small body of air. An aircraft using forced vortices to produce lift is efficient because it imparts downward momentum to a large body of air. It acellerates a large mass of air a little bit.

Increasing the Efficiency of Lift Generation by Partially Protecting the Upward Driving Forced Vortex Surfaces The sides of the forced vortices nearest to the bilateral plane of symmetry is defined as the proximal surfaces of the forced vortices. The sides of the forced vortices furthest from the plane of bilateral symmetry are defined as the distal surfaces of the forced vortices. The proximal surfaces of the forced vortices drive up and the distal surfaces of the forced vortices drive downward. By tipping the left and right lifting surfaces so that more than half of the distal or upward driving surfaces of the vortices are protected from the surrounding air masses and more than half of the distal or downward sides of the vortices are exposed to the surrounding air masses the efficiency of the lift generation process is increased.

DESCRIPTION OF PRIOR ART

From the time humans first learned to fly they have had only one practical way to produce lift: the wing. The wing yielded a mode of travel that was a substantial improvement in many ways over other modes of travel. Wings have some important shortcomings, however:

a) The velocity asymmetries around the surfaces of wings are the basis for the lift they generate. When wings move through the air, they produce substantial drops in pressure at their upper and lower surfaces. The forces generated on the upper and the lower surfaces of the wing, however, point in opposite directions so that they almost completely cancel out.

b) Because wings have low life factors they have to be large in order to generate a practical amount of lift. The large size of the wings causes them to create a lot of drag when they move through the air.

c) Winged aircraft have a fairly narrow range of speed that they work well in. In order to get off the ground they must have a much larger wing than they need after they have gained speed. The large wing needed to take off creates a lot of drag at high velocity. That makes if very hard to fly at supersonic or hypersonic speeds.

d) Wings have to be moved at fairly high velocity in order to produce practical amounts of lift. That means that they have a lot of room to operate and that winged aircraft are dangerous to bystanders. That is true even for rotary winged craft (helicopters).

e) Wings waste a lot of energy because they shed powerful vortices into the passing air as they generate lift. The energy that goes into those vortices contributes nothing to the generation of lift by the wing.

f) Wings can suddenly stop producing lift. If a winged aircraft flies too slowly the wings stall and can cause a crash.

g) Wings can't produce lift when they are standing still. To make a craft that can hover while it is standing still, means that the wings must be incorporated into a mechanism that swings them through the air. That mechanism and the wing together is called a rotary wing mechanism. It is very complicated and requires a lot of maintenance to operate reliably.

h) Rotary wing mechanism is inefficient.

i) Rotary wing craft are complicated and thus require a lot of maintenance.

j) The rotary wing mechanisms operate asymetrically when a helicopter moves forward through the air. Without a corrective mechanism the helicopter produces greater lift on one side than the other. The forward sweeping wings would experiences a much higher air velocity than an aft sweeping wing. An elaborate hinge system is able to correct of those air flow asymmetries at low speed. The is no corrective mechanism that allows a helicopter to operate at speeds faster than 250 m.p.h.

Objects and Advantages

Accordingly, besides the objects and advantages of the apparatus and process for producing lift with line vortices described in my above patent, several objects and advantages of the present invention are:

a) to provide a lift apparatus and process that uses the Bernoulli Effect to generate lift b) to provide a lift apparatus and process that is efficient c) to provide a lift apparatus and process that produces lift factors of at least 200 lb. per sq. ft.

d) to provide a lift apparatus with lifting surfaces that are an integral part of the fuselage thus don't crate drag by projecting into the passing air stream e) to provide a lift apparatus and process that can operate efficiently at a range of velocities from hovering to hypersonic f) to provide a lift apparatus and process that can be safely operated in small confines g) to provide a lift apparatus and process that does not waste energy by shedding vortices into the passing air stream h) to provide a lift apparatus and process that is stall resistant and reliably produces lift at all craft velocities i) to provide a lift apparatus and process that allows a craft incorporating it to hover but is mechanically much simpler than the rotary wing of the helicopter j) to provide a lift apparatus and process that produces only balanced torques so that it can both hover and travel forward without producing any residual torques that act on the craft as a whole.

The object the lift generating process and apparatus that is the subject of this patent is to generate lift by producing volumes of low pressure air above lifting surfaces. A by product of lift producing process is a defuse air stream that flows downward away from the lift generating apparatus.

Reference Numerals in Drawings

100 is the power plant(s) such as a turbine(s)
201, 202 are the left and right impellers
201a, 202a are the drive shafts for the left and right impellers.
201b, 202b are the blades of the left and right impellers.
201c, 202c are the spoke sets of the left and right impellers.
211 Step, apply counter clockwise torque to left impeller.
212 Step, apply clockwise torque to right impeller.
221, 222 Steps, create left and right forced vortices by imparting angular momentum to vortices
231, 232 Steps, left and right impellers imparting reactive torques to the power plant(s)
240 Step, the cancellation of reactive torques at the
301 is the left counter clockwise rotating forced vortex
301a is the left forced vortex surface
302 is the right clockwise rotating forced vortex
302a is the right forced vortex surface.
311, 312 Steps, the downward acceleration of air in contact with the downward driving surfaces of the left and right forced vortices
401, 402 are the left and right air knives.
411, 412 Steps, sever entrained, accelerated air surrounding the left and right forced vortices
501, 502 are the left and air guides
511, 512 Steps, guide high velocity air away from the still or lower velocity air in contact with lower sides of the lifting surfaces.
600 is the gross payload lifted by the lifting surfaces. The gross payload is: the assembly generating the lift, the remainder of the aircraft that the load mechanism is incorporated in, and the aircraft's cargo.
601, 602 are the left and right lifting surfaces 601a, 602a are the proximal edges for the left and right lifting surfaces.
601b, 602b are the distal edges for the left and right lifting surfaces.
601c, 602c are the dihedral planes that are defined by the proximal and distal edges for the left and right lifting surfaces.
601d, 602d are the left and right dihedral angles subtended by the plane of center lines, 630, and the dihedral planes, 601c and 602c.
610 is an imaginary plane of bilateral symmetry which bisects the angle between the dihedral planes of the lifting surfaces as well as bisecting the craft in which they are incorporated into a left half and a right half. The left half of the craft is the mirror image of the right half of the craft.
611, 612 Steps, rotate fresh surfaces of left and right forced vortices into contact with upper sides of the lifting surfaces 601 and 602.
621, 622 Steps, transmit lifting force to payload resulting from pressure differentials caused by having high velocity vortex associated air in contact with the upper surfaces of the load couplers, and by having still or lower velocity air in contact with the lower surfaces of the load couplers.
623 Step, the creation of a resultant force from the lifting forces developed by the individual lifting surfaces, 601 and 602.
630 is the imaginary plane of center lines defined by the center lines for the half-cylinder lifting surfaces
631, 632 Steps, make surfaces of forced vortices, 301 and 302 chaotic or turbulent by bringing them into contact with roughened of lifting surfaces, 601 and 602.
641, 642 Steps, protect upward driving surfaces of forced vortices 301 and 302 to prevent substantial upward acceleration of air surrounding the forced vortices.
701 is the left front vortex seal.
703 is the annular left rear vortex seal.
703a is the orifice in the left rear vortex seal.
702 is the right front vortex seal.
704 is the annular right rear vortex seal.
704a is the orifice in the right rear vortex seal.

711 Steps, seal both ends of left vortex, 301, with the to prevent outward radial motion of the air in it.

712 Steps, seal both ends of right vortex, 302, with the to prevent outward radial motion of the air in it.

801, 802 are the left and right air evacuators or pumps such as turbines.

811, 812 Steps, evacuate or pump air out of the cores of the left and right forced vortices through the orifices, 703*a* and 704*a* in the left and right rear vortex seals, 703 and 704.

821, 822 Steps, draw turbulent air inward once the upward moving surfaces of the left and right forced vortices, 301 and 302, have cleared the upper edges of the left and right load couplers, 601 and 602.

831, 832 Steps, replace inwardly drawn, turbulent air from surfaces of the left and right forced vortices, with the more laminar air surrounding the surfaces the left and right forced vortices.

DRAWING FIGURES

FIG. 1 is an end view 2D block drawing showing the imaginary planes: the plane of bilateral symmetry 600, the lifting surface center line plane 630, the dihedral plane, 601*c*, for left lifting surface, 601, and the dihedral plane, 602*c*, for the right lifting surface, 602. The planes are used for purposes of reference to describe spatial relationships between components of this invention. The drawing also shows the proximal and distal edges, 601*a* and 601*b* of the left lifting surface and the proximal and distal edges, 602*a* and 602*b*, to the right lifting surface. The proximal and distal edges of the lifting surfaces define the dihedral planes.

FIG. 2 is an end view block diagram showing the power plant 100 and impellers 201 and 202 and impeller spokes sets 201*c* and 202*c*. The power plant is shown as a single entity but can be a pair of gas turbines. One for the left impeller and one for the right impeller.

FIG. 3 is an end view block diagram showing power plant 100 applying torques, represented by solid arcs, to impellers 201 and 202 in steps 211 and 212. The diagram also shows impellers 201 and 202 applying reactive torques, represented by dotted arcs, to the power plant in steps 231 and 232. The diagram also shows the cancellation of the oppositely directed reactive torques leaving no net reactive torques acting on the power plant in step 240 represented by an arc of zero length.

FIG. 4 is an end view block diagram showing how the impeller blades, 201*a* and 202*a*, initiate forced vortices by forcing the periphery of the volumes of air embedded in the impellers to rotate with the same angular velocity as the impellers.

FIG. 5 is an end view block diagram showing transfer of angular momentum from the periphery to the interior of the embedded volumes of air in impellers, 201 and 202, to complete steps 211 and 212 to form forced vortices 301 and 302. The block diagram also shows the defined surfaces, 301*a* and 302*a*, of the forced vortex.

FIG. 6 is an end view block diagram showing the spacial relationships between the lifting surfaces, 601 and 602, the air guides, 501 and 502, and the intersection of the those elements to form the air knives 401 and 402.

FIG. 7 is an end view block diagram showing the spacial relationships between the impellers, 201 and 202, the lift surfaces, 601 and 602 and air guides, 501 and 502.

FIG. 8 is an end view block diagram showing the spacial relationships between the forced vortices, 301 and 302, their surfaces 301*a* and 302*a*, and the lift surfaces, 601 and 602, air guides, 501 and 502.

FIG. 9 is an end view block diagram of volumes of air that are near to the forced vortices 301 and 302 being accelerated downward by frictional forces generated by vortices 301 and 302. Those volumes are shown as being separated from the vortices 301 and 302 by the air knives, 401 and 402, once those volumes reach those air knives. As those volumes continue to move downward they are shown being guided away from the underside of the lifting surfaces 601 and 602 by the air guides, 501 and 502.

FIG. 10 is an end view block diagram depicting, with arrows, the centrifugal forces acting on a forced vortex causing it to spread radially and draw air into is core because its ends are unsealed. The white circle in the center of the vortex diagram represents slow moving air with little angular momentum that has been drawn into the core.

FIG. 11 is an end view block diagram that is an end view of the of the vortex seals positioned relative to the lifting surfaces 201 and 202 and air guides, 501 and 502.

Figure 14:
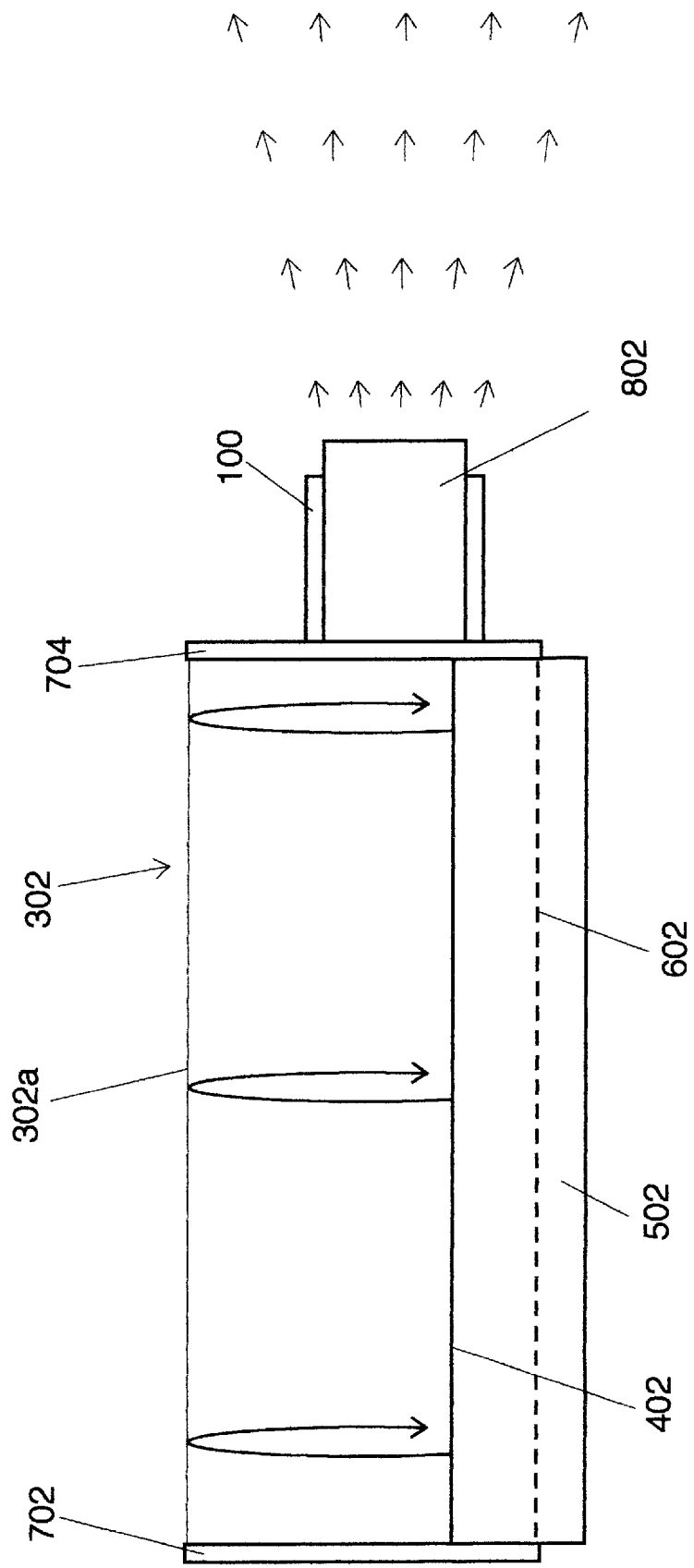

FIG. 14 is a block diagram, right side view of the lift producing assembly, showing air being extracted from the core of the forced vortex, 302, by the air pump, 802. The drawing also shows the right vortex seals 702 sealing each end of forced vortex 302. Left vortex 301 simultaneously undergoes an identical processes.

Figure 15:
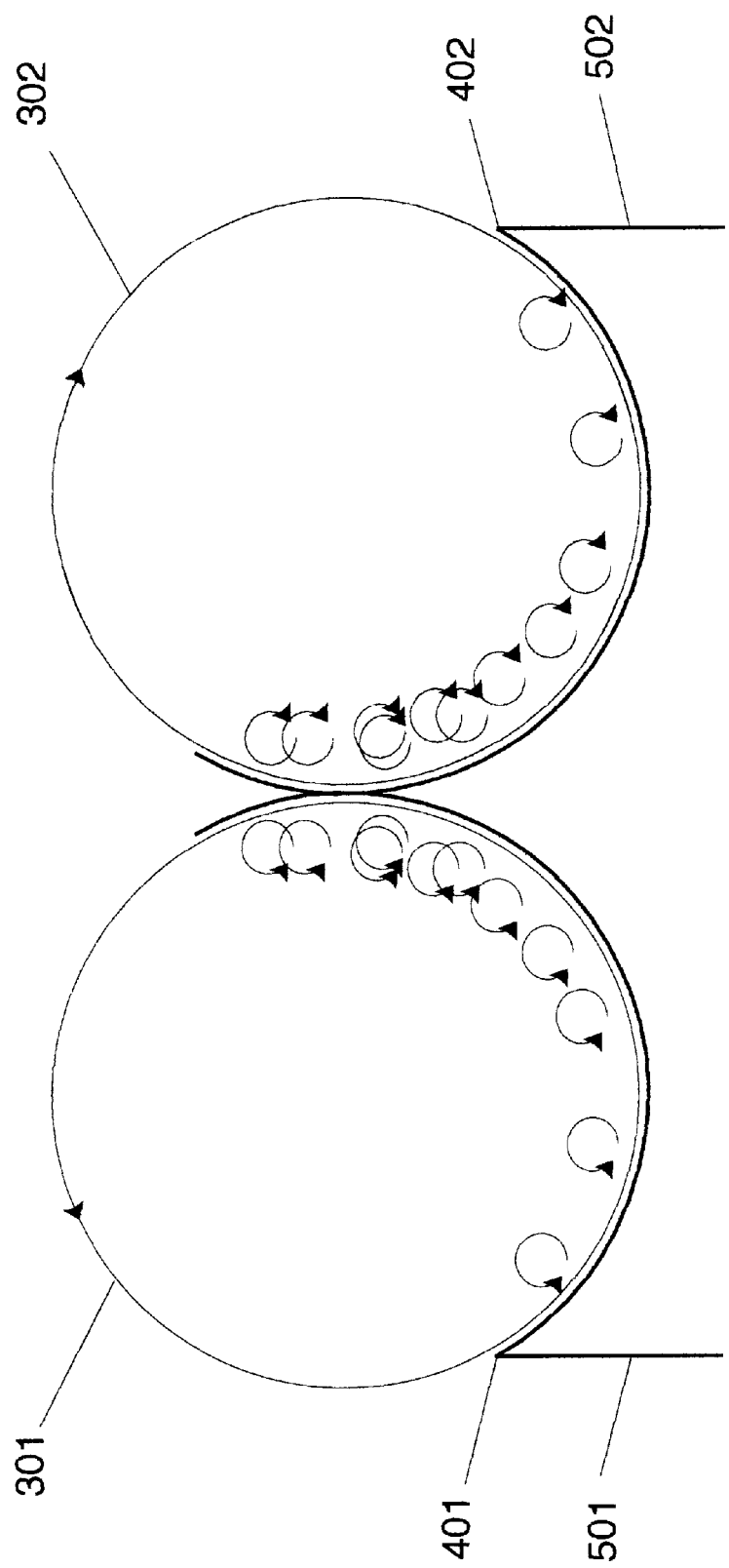

FIG. 15 is a side view block diagram showing the creation of turbulence near to the surfaces of the lift surfaces, 601, and 602, in steps, 631 and 632, for the purpose of reducing air viscosity.

Figure 16:
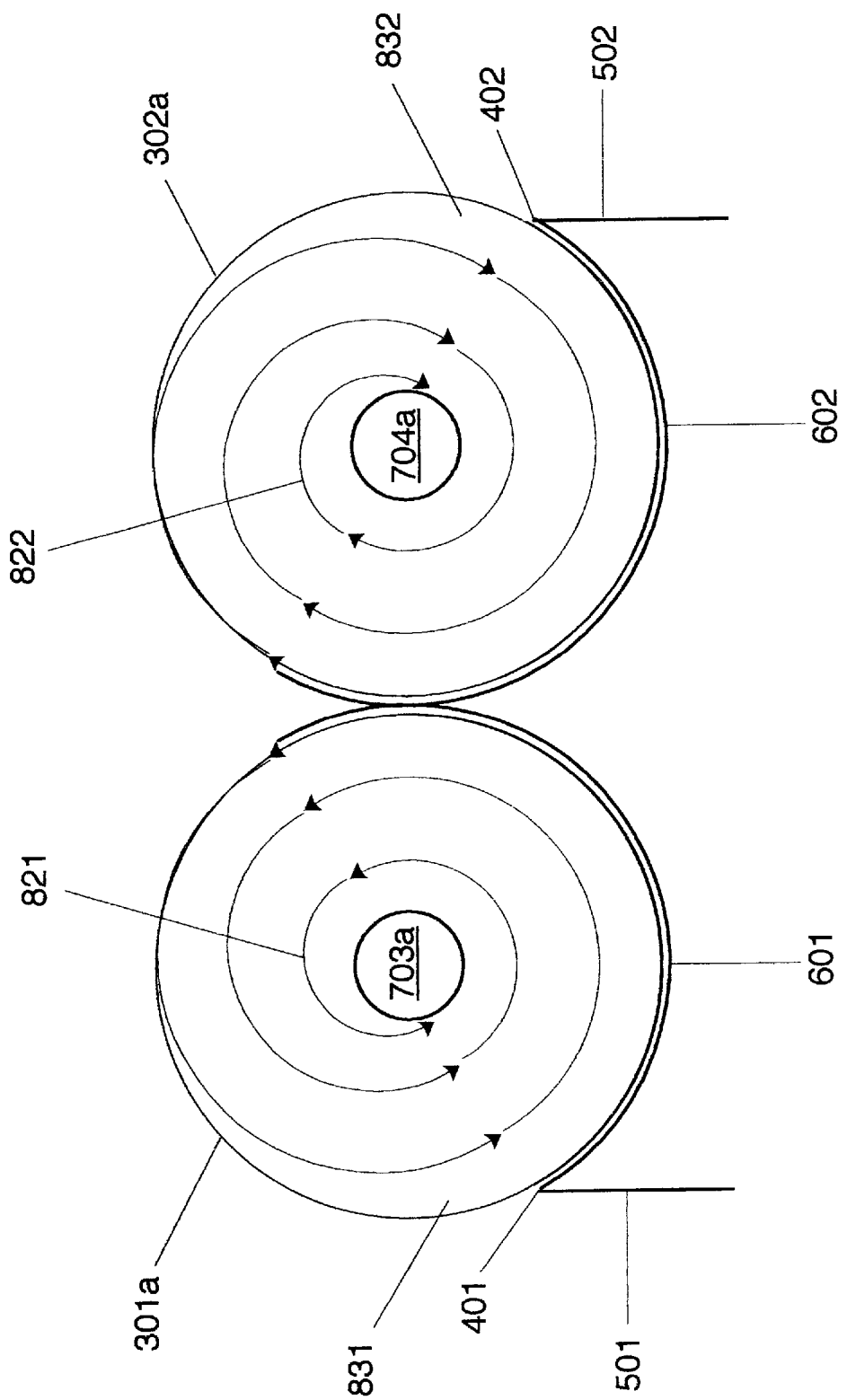

FIG. 16 This diagram also shows steps 831 and 832. Those steps are the replacement of the chaotic air drawn inward, in steps 821 and 822, with laminar air drawn from just outside the forced vortices surfaces. The spiral arrows show the streamlines that the chaotic air follows. The streamlines are concentric to the lifting surfaces while inside the half-cylinder lifting surfaces, 601 and 602. The streamlines spiral inward outside of the lifting surfaces.

Figure 17:
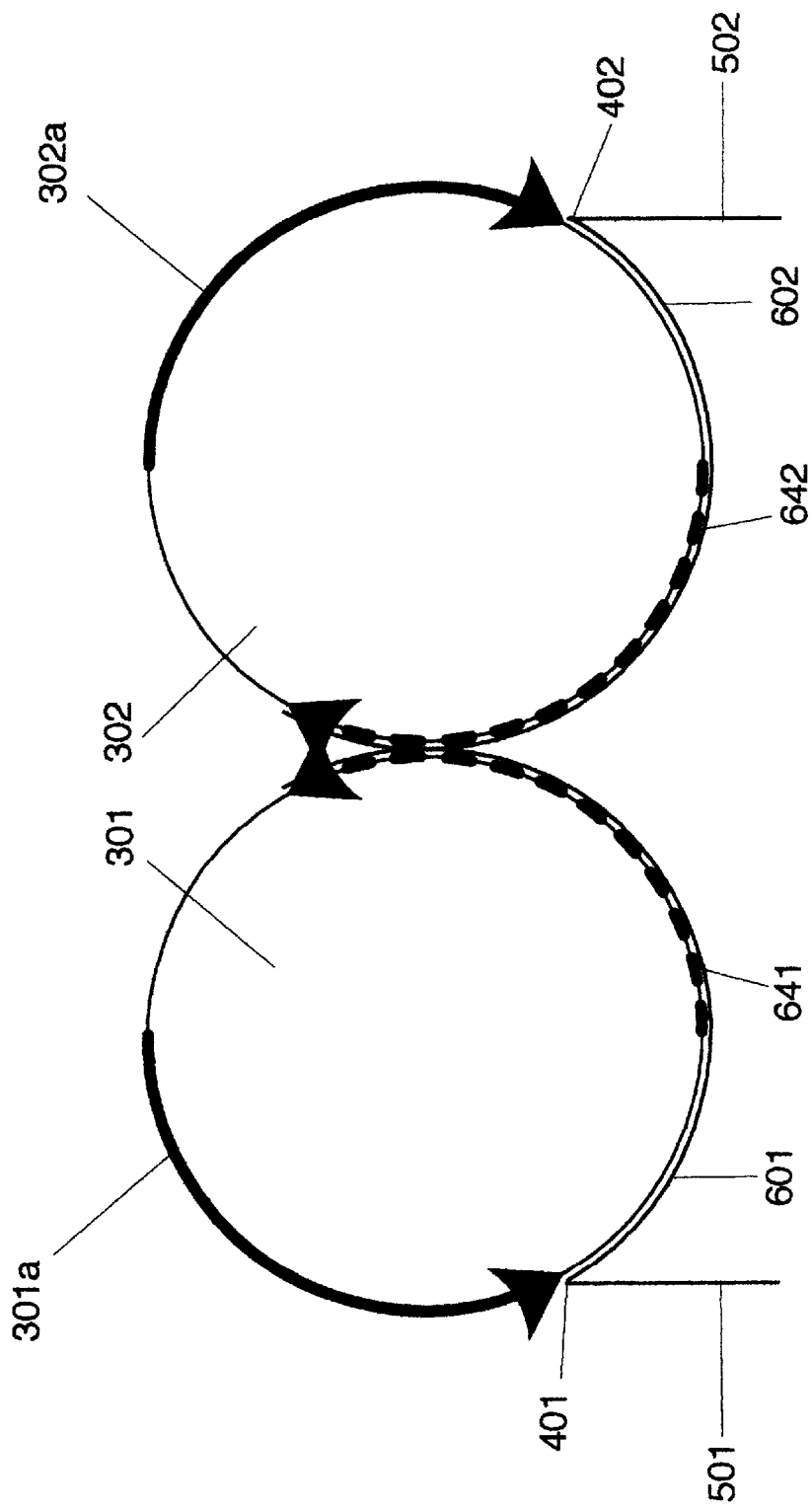

FIG. 17 is a block diagram of showing the orientation of the lifting surfaces 601 and 602. The proximate sides of 601 and 602 protect more than half of the upward driving surfaces of forced vortices, 301 and 302, carrying out steps 641 and 642. The distal sides of lifting surfaces 601 and 602 protect less than half of the downward driving surfaces of forced vortices, 301 and 302, and, because of that, enhance steps 311 and 312, the downward acceleration of the air around the exposed surfaces of forced vortices, 301 and 302. All aircraft that produce lift by the Bernoulli effect create a downwash of air as a by product. There can be no lift generated aerodynamically unless net downward momentum is imparted to the air surrounding aircraft lifting surfaces. The orientation of the lifting surfaces is intended to maximize that downwash of air without sacrificing much upward facing surface areas of the lifting surfaces, 601 and 602.

Figure 18:
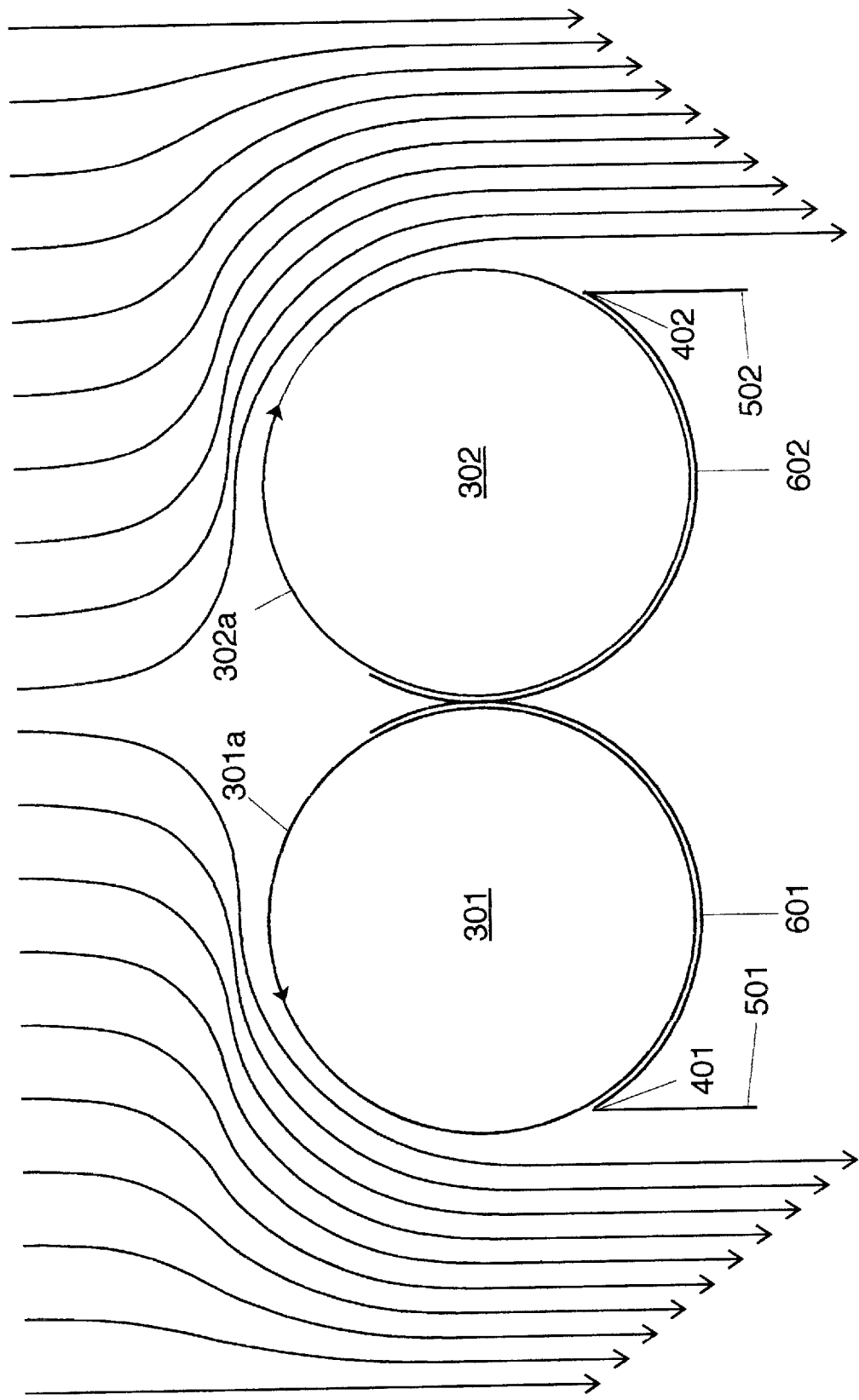

FIG. 18 shows the location of all the bodies of air interacting with the assembly generating the lift process. It shows the low pressure forced vortices, 301 and 302, that are in contact with the upper surfaces of 601 and 602. It shows the downwashes created in steps 311 and 312 when the air in contact with 301 and 302 is accelerated downward. And lastly, it shows the higher pressure, lower velocity air that is protected and maintained by the air knives, and air guides in steps 411 and 412, and steps 511 and 512.

Figure 19:
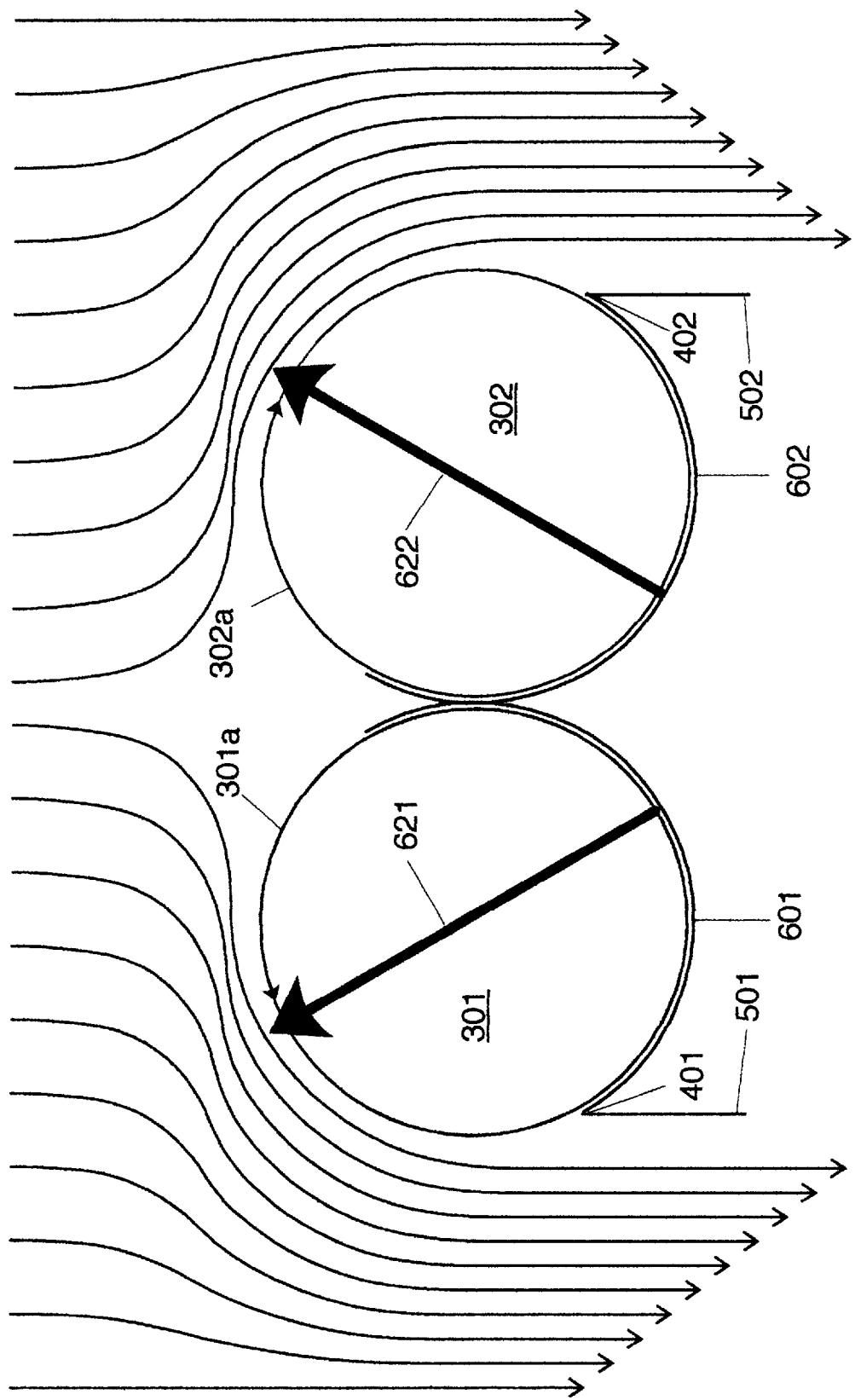

FIG. 19 shows the forces acting on the lifting surfaces, 601 and 602. Forces are vectors and are usually represented, graphically, with arrows. The forces generated by the load couplers 601 and 602 are represented by heavy straight arrows in the drawing. Because the lifting surfaces are tilted the forces generated by 601 and 602 are also tilted. The figure also shows the four bodies of air created by the lift process: the left and right forced vortices 301 and 302, the down wash of entrained air created in steps 311 and 312, and the low velocity high pressure air protected by air guides 401 and 402.

Figure 20:
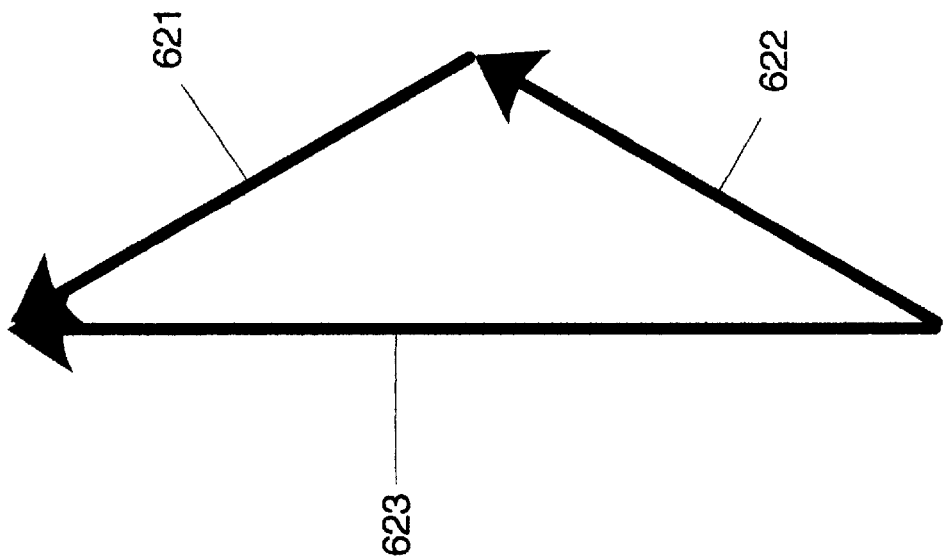

FIG. 20 is a vector diagram showing the total lifting force resulting from steps 621 and 622.

Figure 21:
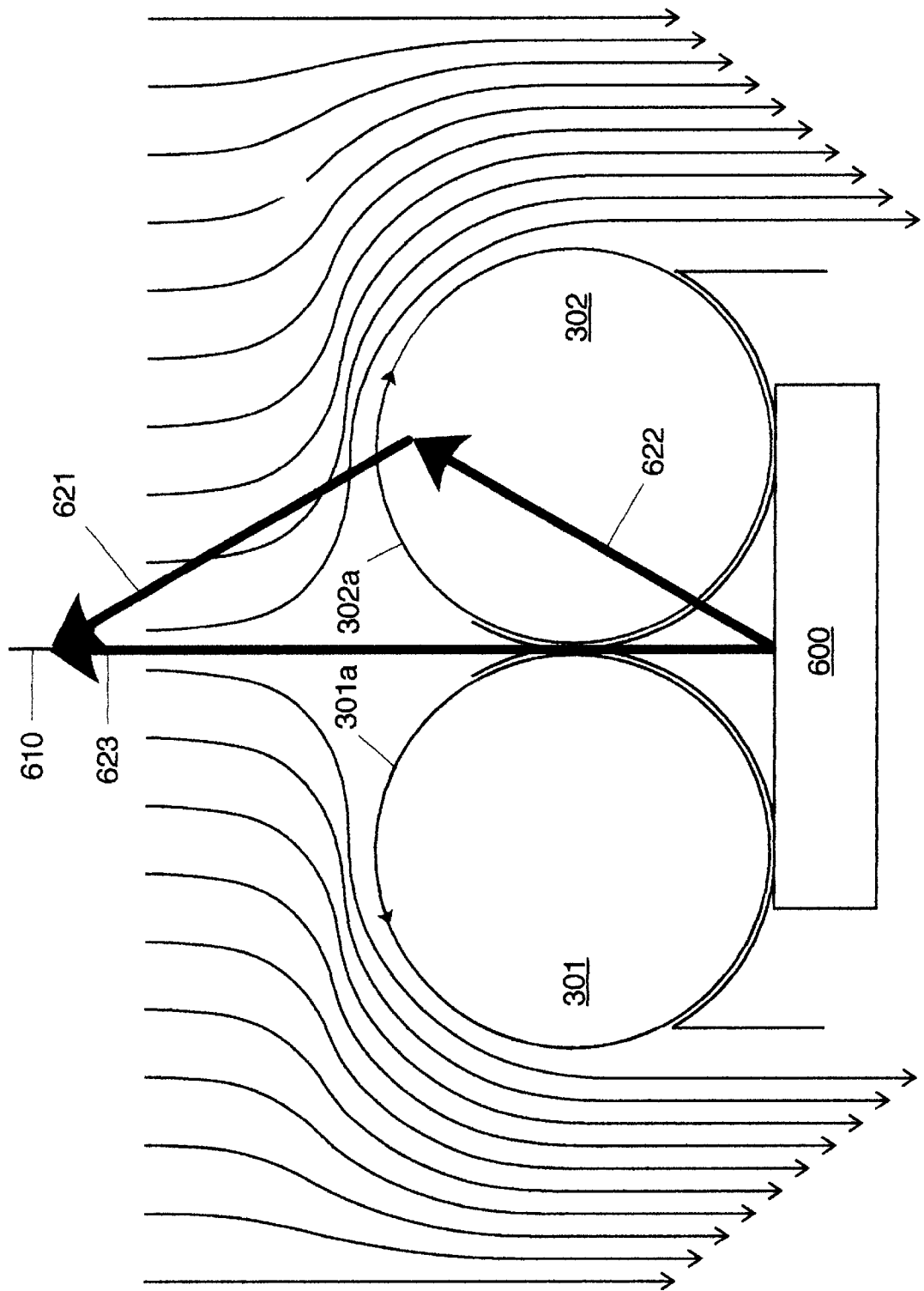

FIG. 21 is a block diagram that shows, symbolically, the resultant lifting force, created by steps 621 and 622, acting on the payload. That resultant lifting force acts on the lift mechanism's plane of bilateral symmetry, 600. The payload in this case is the gross payload. The gross payload is: the assembly generating the lift, the remainder of the aircraft that the load mechanism is incorporated in, and the aircraft's cargo.

Figure 22:
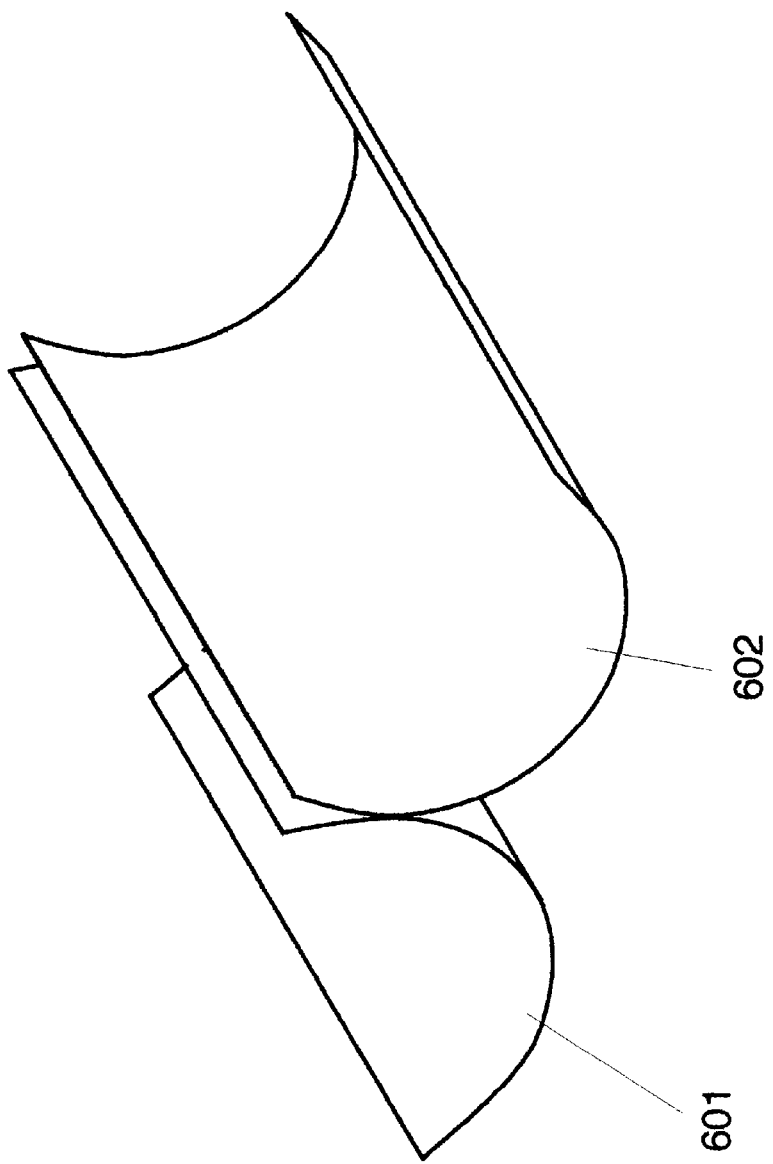

FIG. 22 is 3D drawing of the lifting surfaces 601 and 602.

Figure 23:
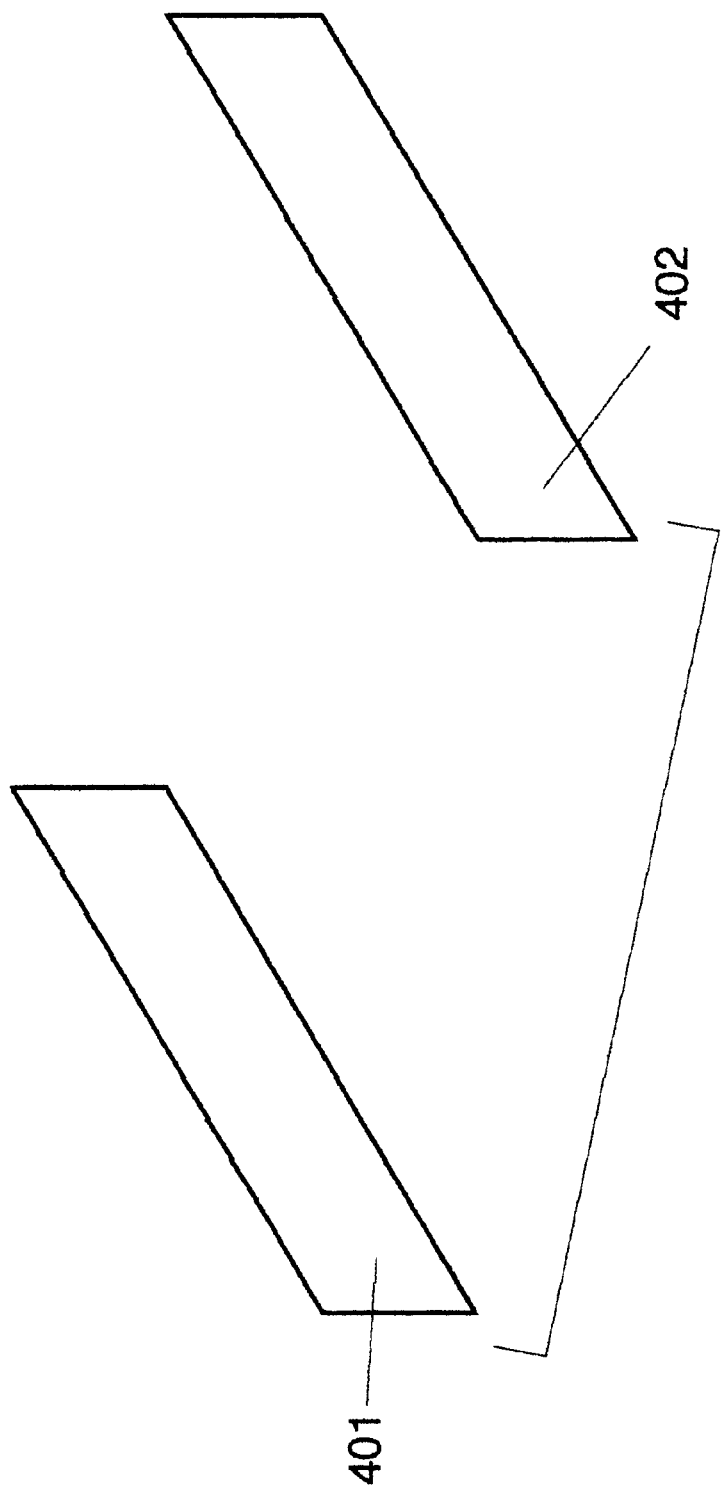

FIG. 23 is a 3D drawing of the air guides 501 and 502.

Figure 24:
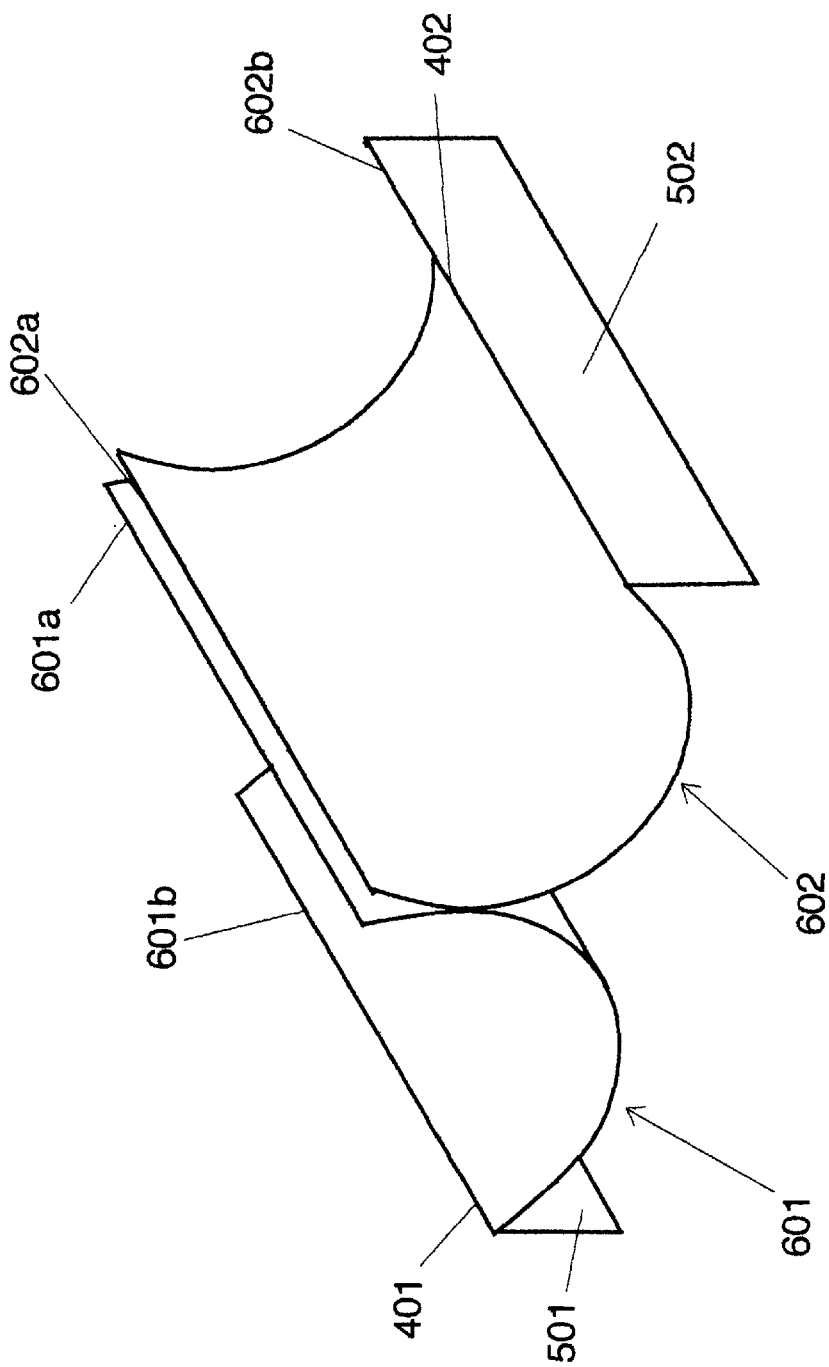

FIG. 24 is 3D drawing that shows the intersection of lifting surfaces with the air guides to form the air knives, 401 and 402. Figure also shows the distal edges, 601a and 602a, and proximal edges, 601b and 602b of the left and right lifting surfaces.

Figure 25:
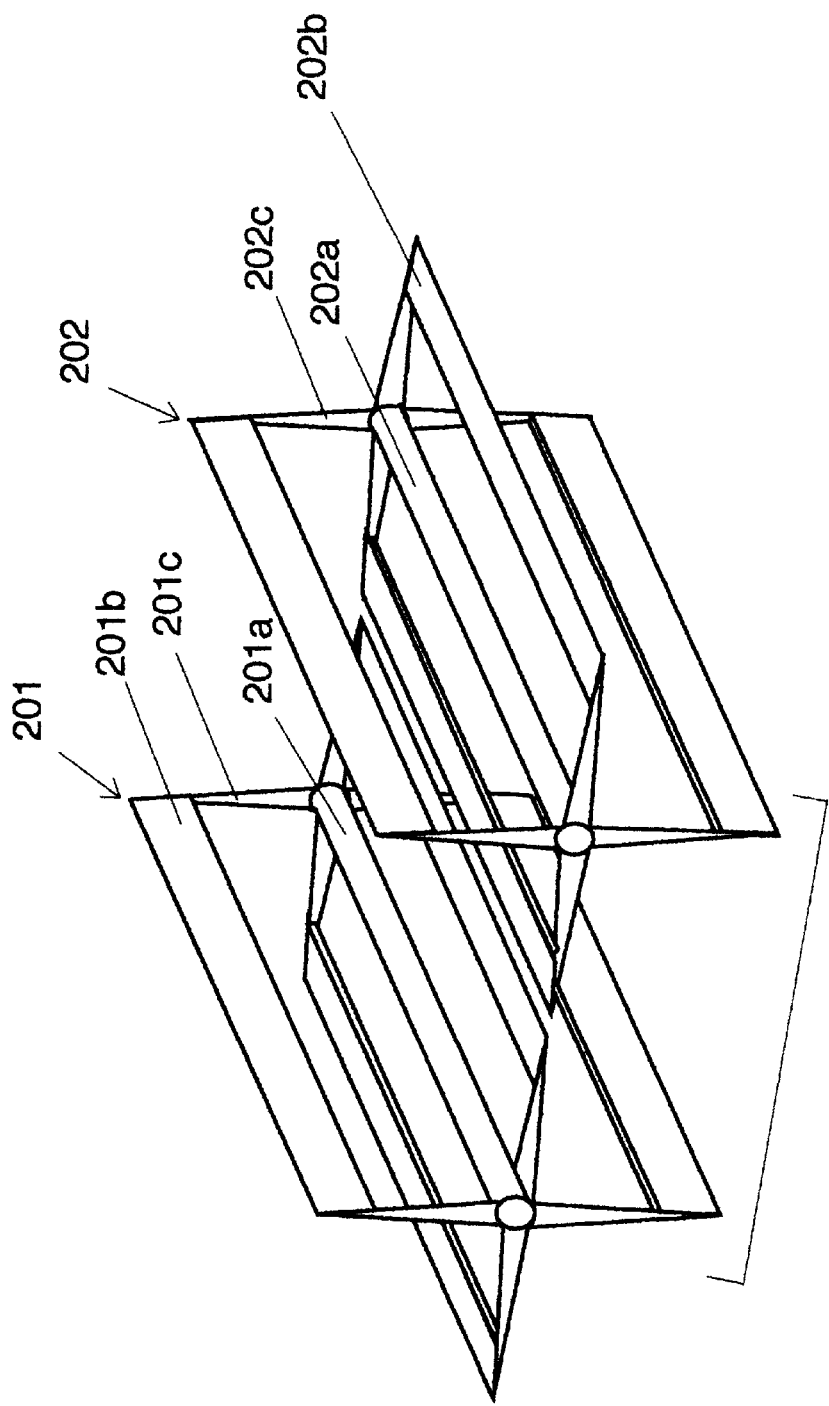

FIG. 25 is 3D drawing of the impellers, 201 and 202.

Figure 26:
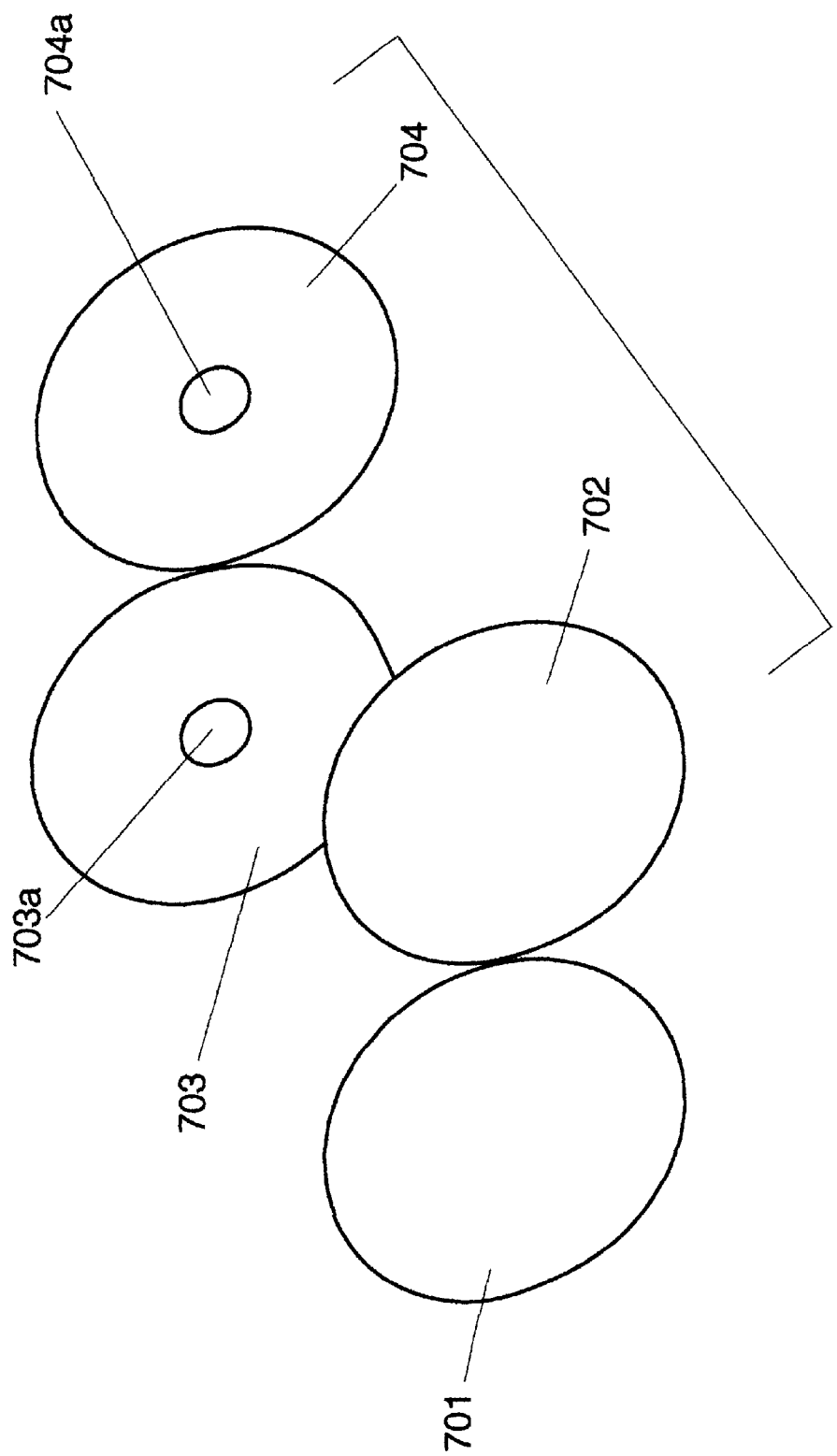

FIG. 26 is 3D drawing of the vortex seals, 801 and 802.

Figure 27:
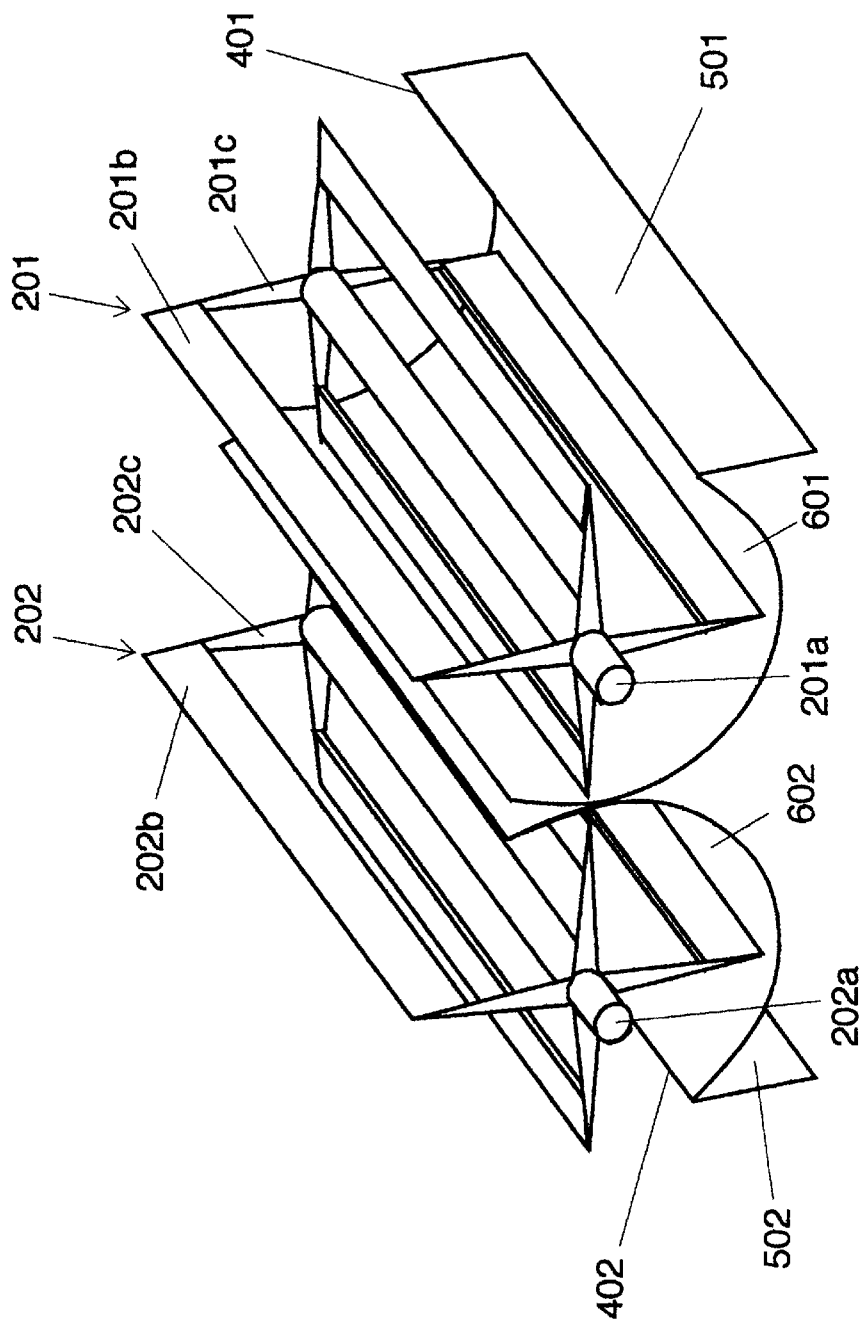

FIG. 27 is 3D drawing of the impellers positioned within the lifting surfaces.

Figure 28:
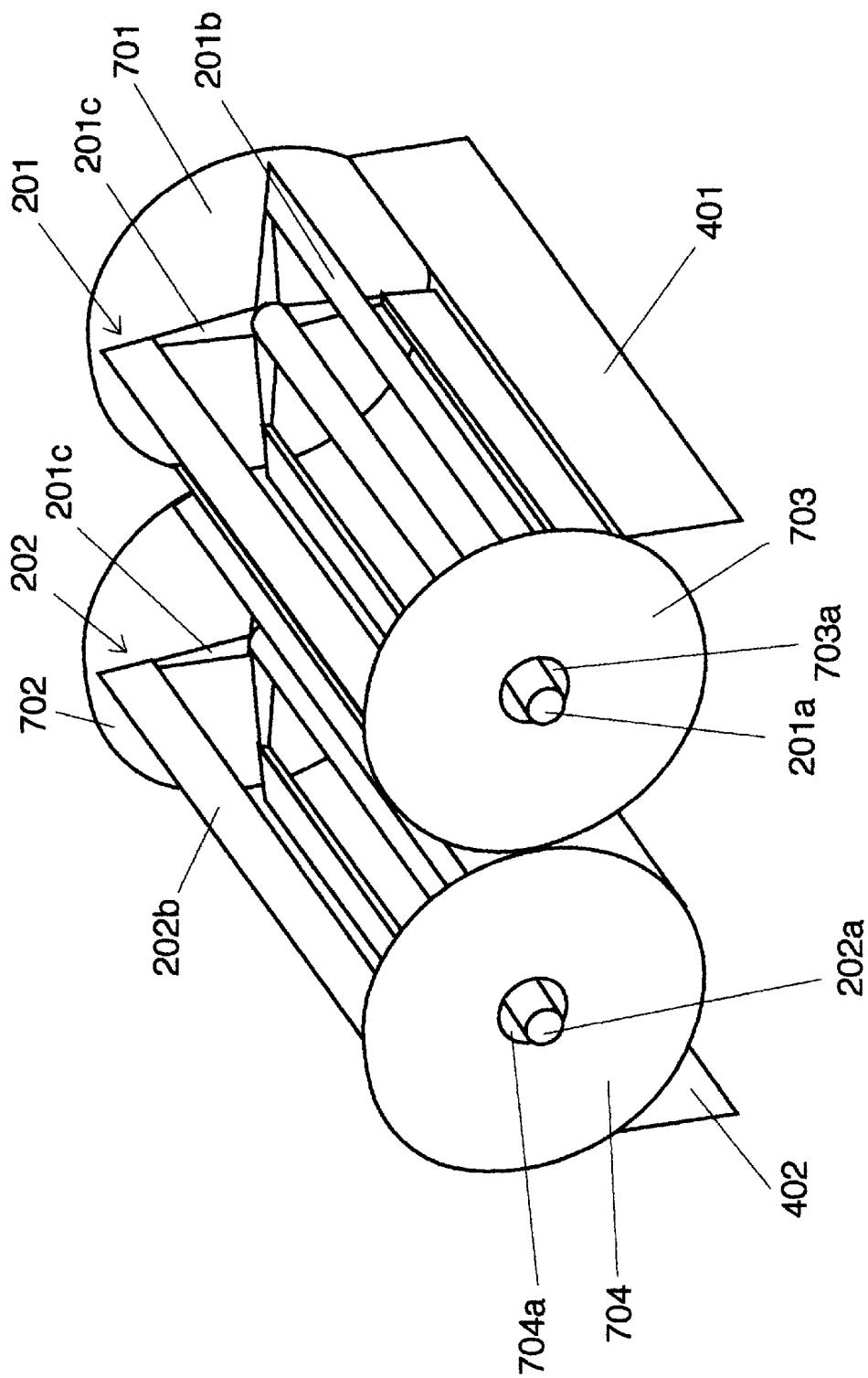

FIG. 28 is 3D drawing of the complete set of aerodynamic surfaces from the rear also showing the projection of the impeller drive shafts through the rear vortex seals.

Figure 29:
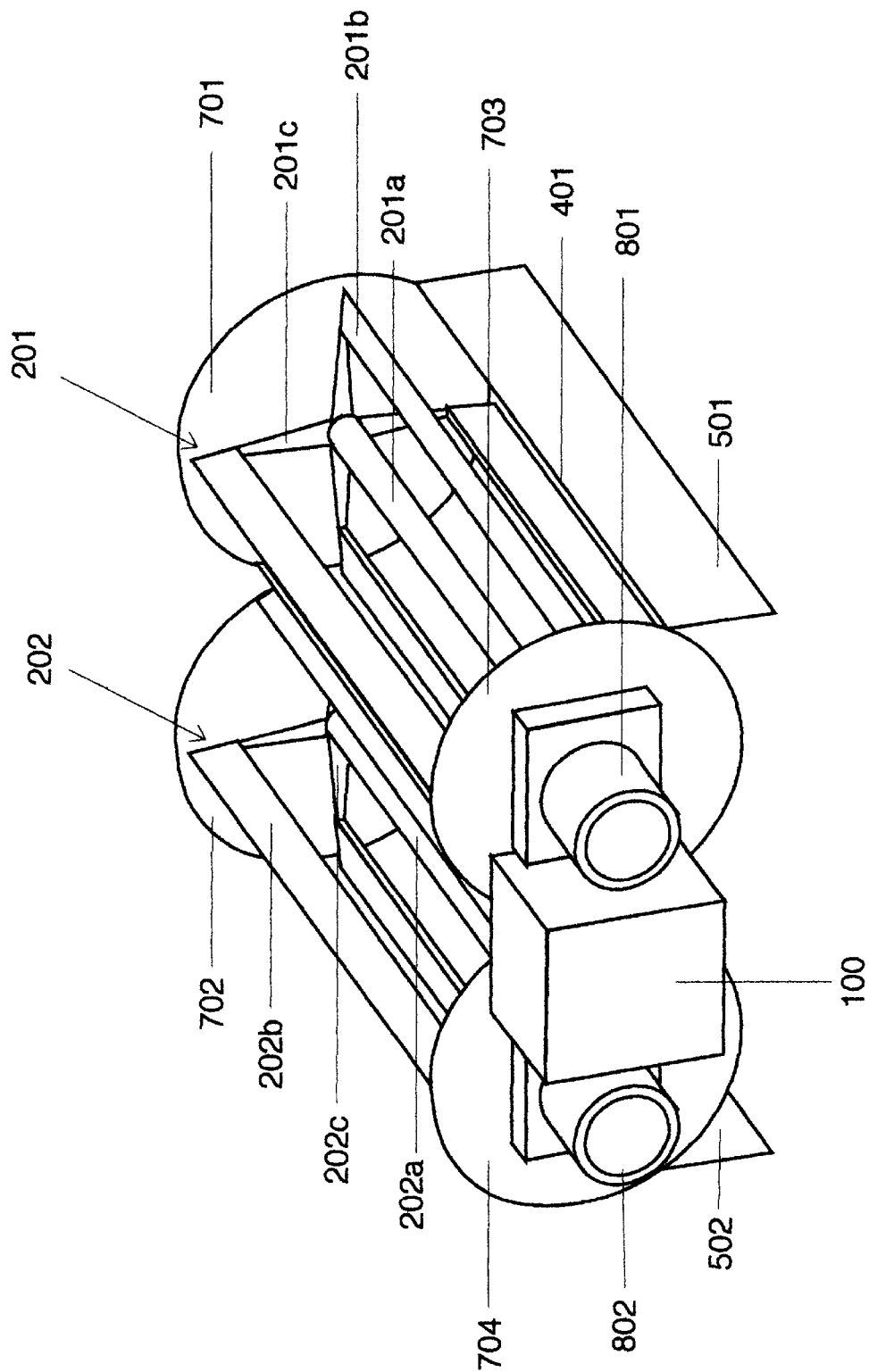

FIG. 29 is 3D drawing the assembly that produces the lift process. It includes all the aerodynamic surfaces plus block representations of the power plant, 100 and the air pumps 701 and 702.

Figure 30:
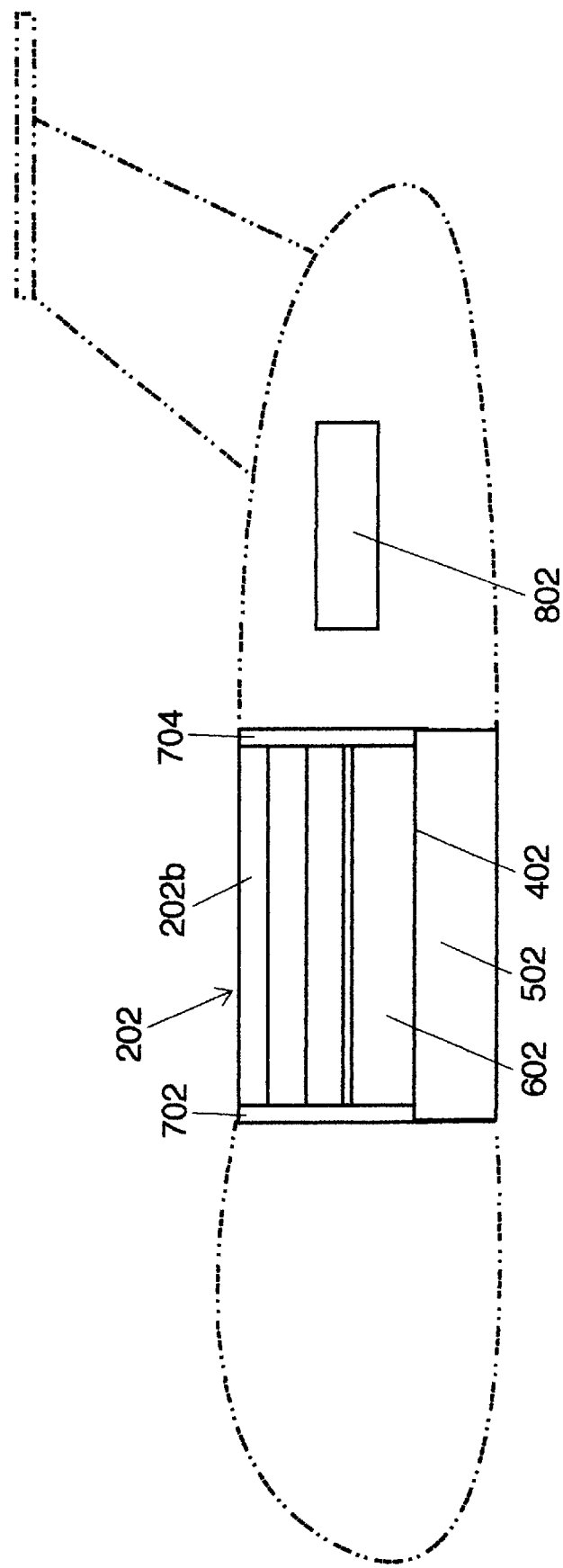

FIG. 30 is a 2D block drawing of the right side view of a sample embodiment of a craft that employs the apparatus and lift process that is the subject of this patent application.

Figure 31:
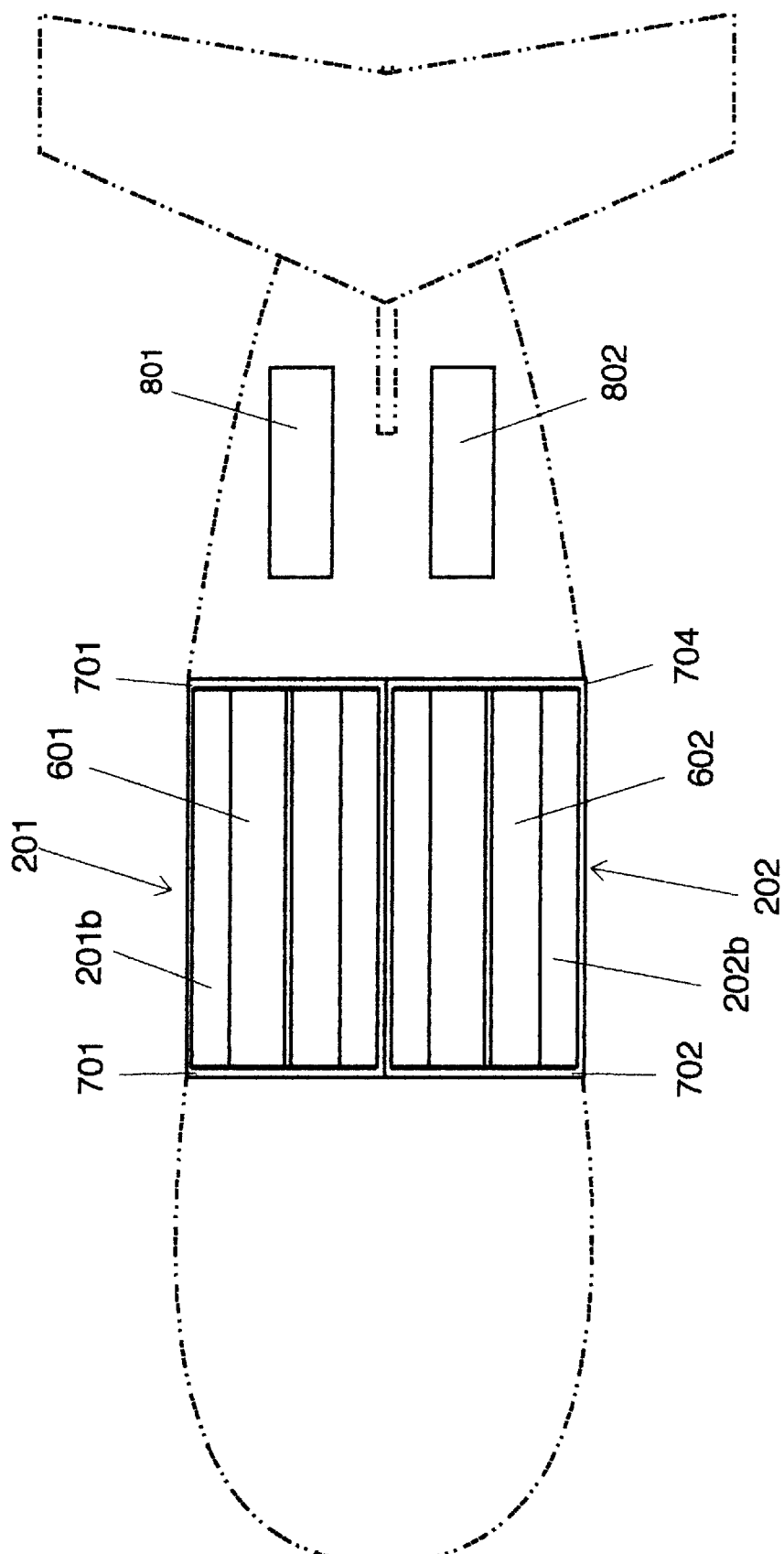

FIG. 31 is a 2D block drawing showing the top view of a sample embodiment of a craft that employs the apparatus and lift process that is the subject of this patent application.

DESCRIPTION

A typical embodiment of the mechanism producing the lift generating process that is the present invention is illustrated in the rear view 3D FIG. 29.

Impellers

A hollow, cylindrical left impeller or rotor, 201, and a hollow, cylindrical right impeller or rotor, 202, are side by side with a space between them as shown in 3D FIG. 25. Both the left impeller and the right impeller have an axis of rotation. Those axes are also parallel and side by side. In addition, each impeller has a center line and an outside diameter. The center line and the axis of rotation for each respective impeller are colinear. That makes the center lines also parallel and side by side.

Figure 7:
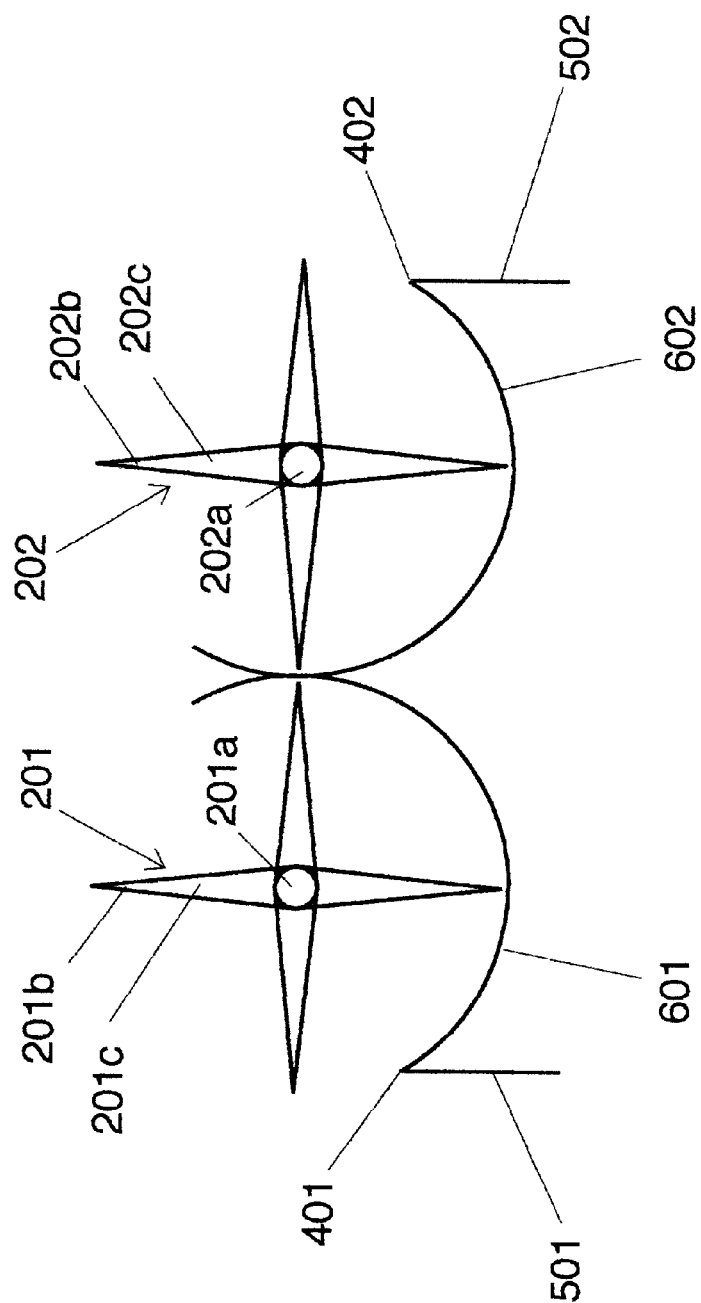

Each impeller has a drive shaft. The drive shaft of each impeller has a center line, a circumference and a diameter. The center line of the drive shaft is colinear with the center line of the impeller as a whole. The center line of the impeller is colinear with the center line of the lifting surfaces, 601 and 602, as well as shown in FIG. 7.

The drive shafts each have a front end and a rear end. Near near each of those ends are an identical plurality of spokes. Those spokes have equal length and mass. Each member of a plurality of spokes is coplanar with a member of the plurality on the opposite end of its drive shaft as shown in FIG. 25.

Connecting each pair of coplanar spokes is a narrow rectangular impeller blade. The each impeller blade has an identical longitudinal axis spanning its length. And each impeller blade has an identical transversal axis spanning its width. Each end of the impeller blades is attached to the outer end of a spoke. The longitudinal axis of each blade of the impeller is oriented parallel to the center line of its respective drive shaft. The transversal axis of each blade of the impeller is perpendicular to and thus oriented radially relative to that center line as shown in FIG. 25.

Plane of Bilateral Symmetry

The space between the parallel center lines is bisected by an imaginary plane, the plane of bilateral symmetry, 610. The plane of bilateral symmetry bisects the device producing the lift process into two parts that are mirror images of each other.

Impellers Attach to Front Vortex Seals

Figure 12:
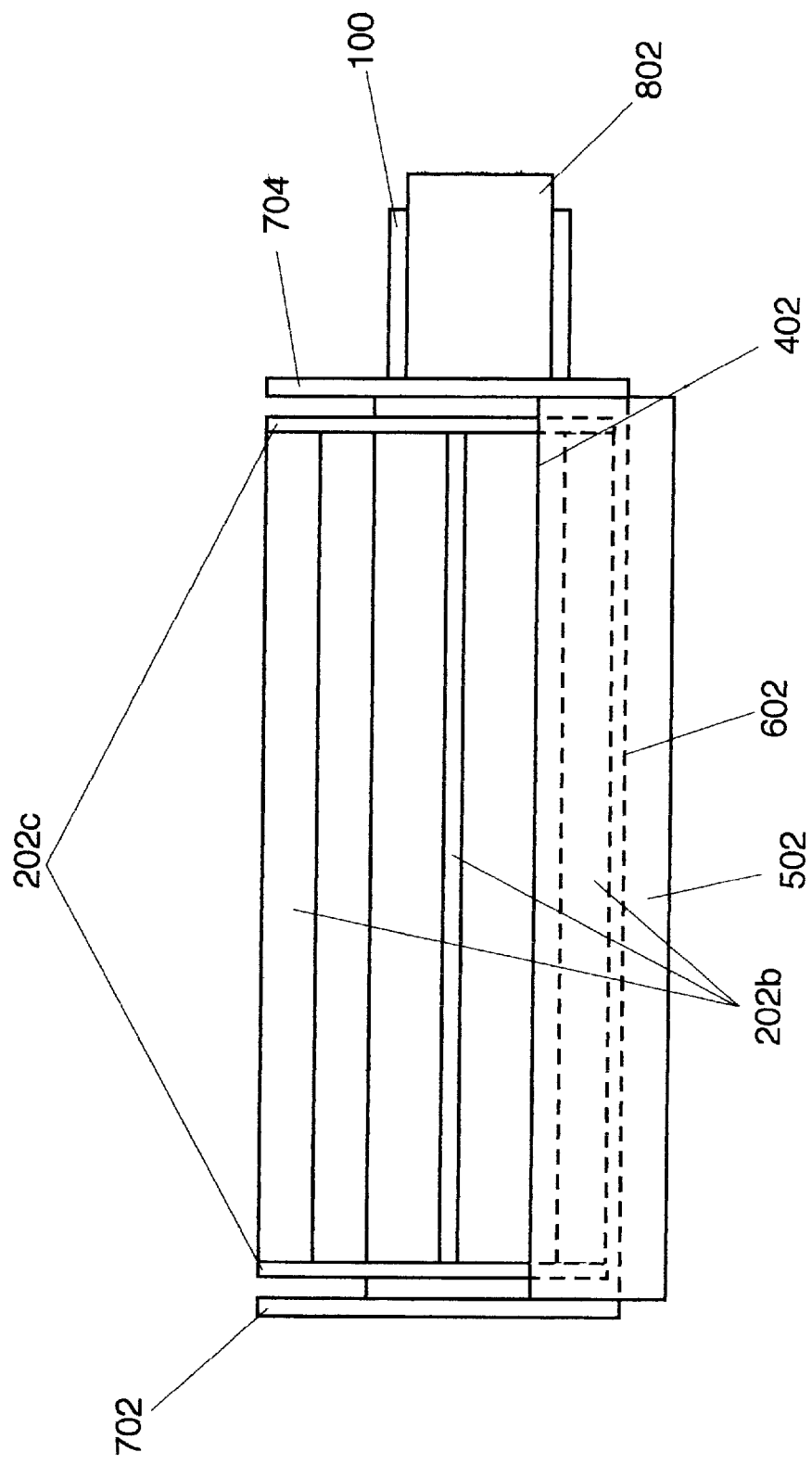
FIG. 12 is a side view block diagram that is a side view that shows how the front and rear vortex seals, 702 and 704, are positioned relative to right impeller, 202 and the lifting surface 602.
Figure 13:
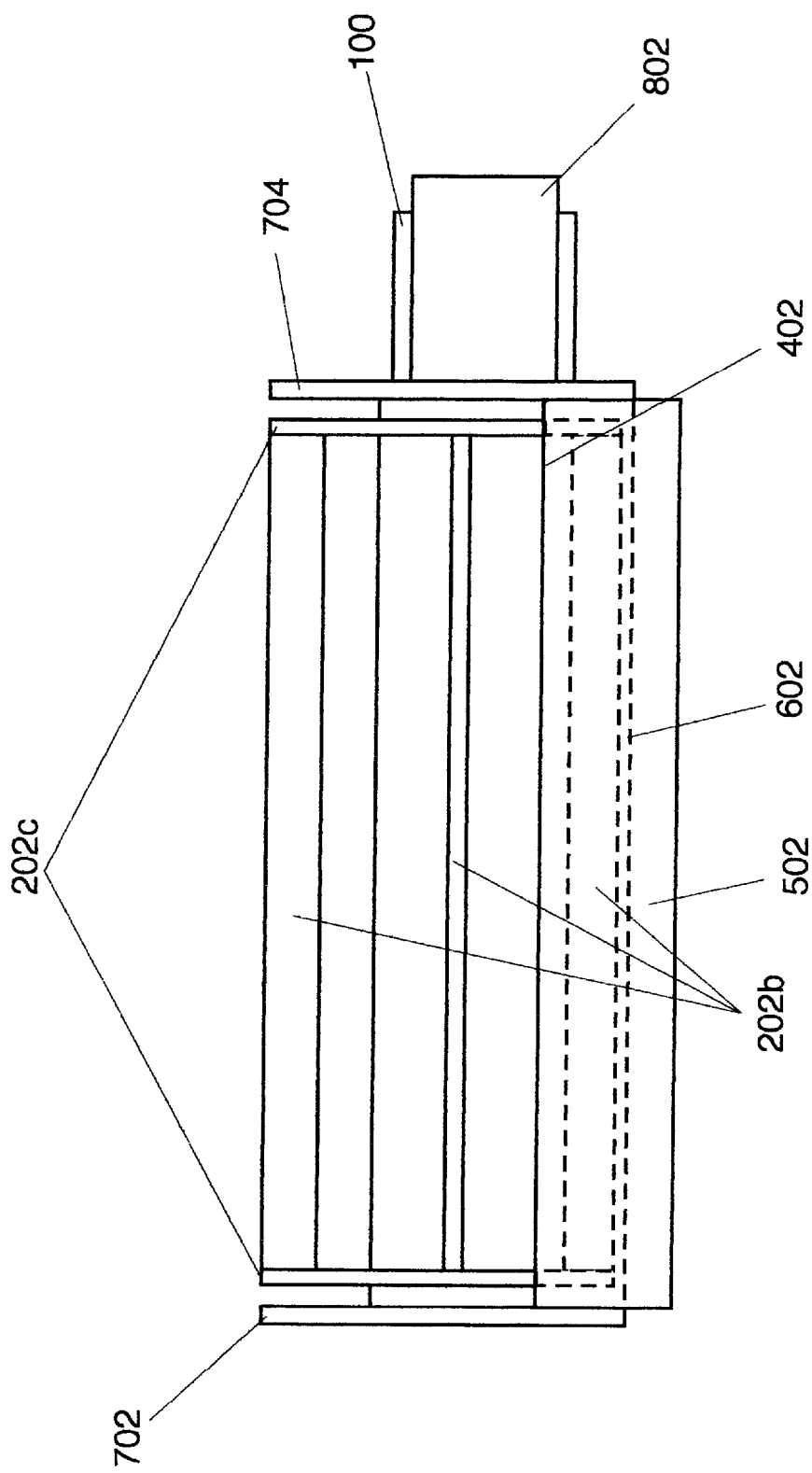
FIG. 13 is a side view block diagram. It highlights the position of air knife, 402, and air guide, 502 relative to the rest of the apparatus generating the lift process.

A front seal of left vortex seals, 701, is attached by rotatable means to the front end of the left drive shaft of 201. A front seal of right vortex seal, 702, is attached by rotatable means to the front end of the right drive shaft of 202. The front vortex seals, 701 and 702, are each planar circular plates with a diameter, a circumference, a lower edge and a center line. They also have an inner surface and outer surface. The inner surface of each front vortex seal faces toward its respective impeller. The vortex seals are oriented perpendicularly to the center lines of their respective impellers as shown in FIG. 12. The center line of each front vortex seal, 701 and 702, is colinear with the center line of its respective impeller. The diameters of the vortex seals are slightly larger than the diameters of the impellers. The front seals, 701 and 702, and rear seals of 703 and 704 are shown in the 3D FIG. 26.

Front Vortex Seals Attach to Front of Lifting Surfaces

The lifting surfaces, 601 and 602, have a front edges and a rear edges.

The lower edge of the left front vortex seal, 701, attaches to the front edge of left lifting surface, 601. The lower edge of the right front vortex seal, 702, attaches to the front edge of the right lifting surface, 602. Both attachments are by fixed air tight means.

The front edges of the lifting surfaces, 601 and 602, attach to the lower sides of the front vortex seals, 701 and 702, while the rear edges of the lifting surfaces, 601 and 602 attach to the lower sides of the rear vortex seals 703 and 704.

Lifting Surfaces

Each lifting surface is semi cylindrical surface with center line, an inner surface, an outer surface, an upper surface and a lower surface. Each lifting surface also has an inside diameter and an outside diameter. The inner surface of each of the lifting surface is concentric to the outer circumference of the lifting surface.

Figure 6:
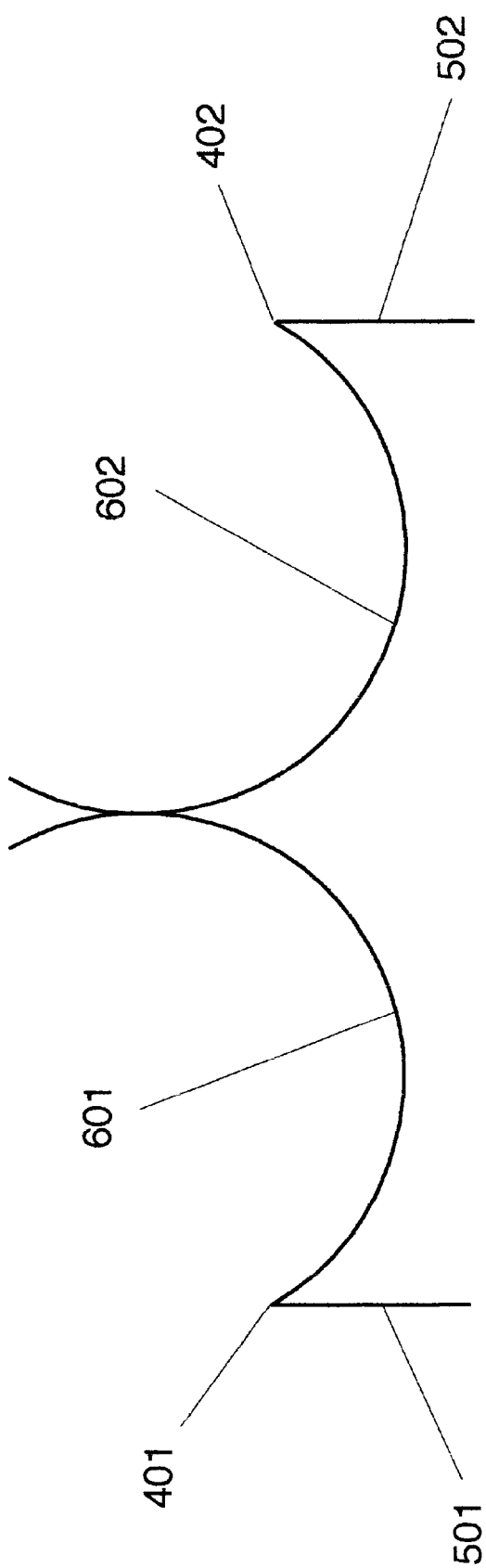

The inside surfaces of, 601 and 602, are defined as the upper sides of the lifting surfaces. And the outer surfaces of the 601 and 602 are defined as the lower sides of the lifting surfaces as shown in FIGS. 6, 27 and others as well.

Plane of Center Lines

The center line of each lifting surface is colinear with the center line of its associated impeller and thus are parallel and side by side as shown in FIG. 27. The two center lines of the half cylinder lifting surfaces, 601 and 602, define another plane, the plane of center lines, 630. The plane of center lines, is perpendicular to plane of bilateral symmetry, 610. Both planes are shown in FIG. 33.

Proximal and Distal Edges of Lifting Surface

The edges, 601a and 601b, of the lifting surfaces, 601 and 602, nearest to the plane of bilateral symmetry are defined as the proximal edges. The edges, 601b and 602b, the edges furthest from the plane of bilateral symmetry is defined as distal edges. Shown in FIGS. 24 and 32.

Dihedral Planes

Since both of the lifting surfaces, 601 and 602, is semi-cylindrical, they each have two edges that are parallel to the center line. The parallel edges of the lifting surface, 601, defines an imaginary plane called the left dihedral plane. The parallel edges of lifting surface 602 defines an imaginary plane called the right dihedral plane.

The right dihedral plane subtends angle, delta, with the plane of center lines, 630. The left dihedral plane subtends an equal but opposite angle,—delta, with the plane of center lines. The angle, delta, should be less than forty five degrees.

The upper surface of left lifting surface, 601 faces the left dihedral plane, 601a. The upper surface of lifting surface, 602, right dihedral plane, 602a.

Air Guides Attach to Lift Surfaces at Distal Edges to form Air Knives

The left air guide, 501, has a length and a width and is attached by a fixed means along its length to the distal edge of the left lifting surface, 601. The right air guide, 502, also has a length and width and likewise is attached by a fixed means along its length to the distal edge of the right lifting surface, 602. The air guides, 501 and 502, are planar surfaces that have the substantially the same length as lifting surfaces, 601 and 602. The width of the air guides is oriented perpendicular to the plane of center lines, 630, of the lifting surfaces, 601 and 602.

The left air knife, 401, is formed at the distal edge of the left lifting surface by the intersection of the left lifting surface, 601, and the left air guide 501. And a right air knife 402 is formed at the distal edge of the right lifting surface by the intersection of the right lifting surface, 602, and the right air guide, 502. Both are shown in FIGS. 6 and 24.

Lift Surfaces Attach to Rear Vortex Seals

The left rear vortex seal 703 attaches to the rear of edge of left lifting surface, 601, by a fixed air tight means. And a rear vortex seal, 704, attaches to the right lifting surface, 602, by a fixed air tight means.

The rear vortex seals, 703 and 704, are each planar circular plates with a circular holes in them, 703a and 704a. The circular plates as well as the circular holes contained within them have diameters and a center line. The center lines of the rear vortex seals, 703 and 704, are colinear with the center lines of the circular holes. The diameters of the holes, 703a and 704a, in the rear vortex seals are equal in size and larger than the diameters of the drive shafts of the impellers as shown in FIG. 26.

The rear vortex seals, 703 and 704, each have an inner surface and an outer surface. The inner surfaces of the rear seals, 703 and 704, face the impellers 201 and 202 and are perpendicular to the center lines of the lifting surfaces, 601 and 602.

Impeller Drive Shafts Extend Through Rear Vortex Seals

The rear ends of the drive shafts of the impellers, 201 and 202, extend through the circular holes, 703a and 704a, past the outer surfaces of the rear vortex seals of 703 and 704. The center lines of the drive shafts are colinear with the center lines of the circular holes. Between the circumferences of the drive shaft and the circumferences of the holes are even margins of space as shown in FIG. 28.

Air Pumps Attach to Rear Vortex Seals

A left air pump, 801, attaches to the outer surface of the rear vortex seal of 703 by fixed means. A right air pump, 802, attaches to the outer surface of the other rear vortex seal, 704, also by fixed means as shown in FIG. 29. The air pumps devices such as turbines.

The air pumps each have an inlet. Those inlets are aligned with the holes, 703a and 704a, in the rear vortex seals, 703 and 704 so that air can flow through the holes and into the inlets of the air pumps. The regions of the rear vortex seals, 703 and 704, surrounding the air pump inlets, 703a and 704a are attached to the rest of the air pumps by fixed air tight means.

Power Plants Attach to Air Pumps and to Impellers

A power plant 100 attaches to left air pump 701 and right air pump, 702, attaches to the left air by transmissive means as shown in FIG. 29. The power plant, 100 is also attached to the left impeller, 201, and right impeller, 202, by transmissive means. The power plant can take the form of two separate power plants such as gas turbines. A left power plant can power the left air pump, 701, and rotate the left impeller, 201. A right power plant can power the right air pump, 702, and rotate the right impeller, 202. Gas turbine power plants can additionally supply thrust for a craft that uses the lifting process and apparatus that is the subject of this patent.

Operation

Referring now to the accompanying drawings:

Rotating Impellers

Figure 1:
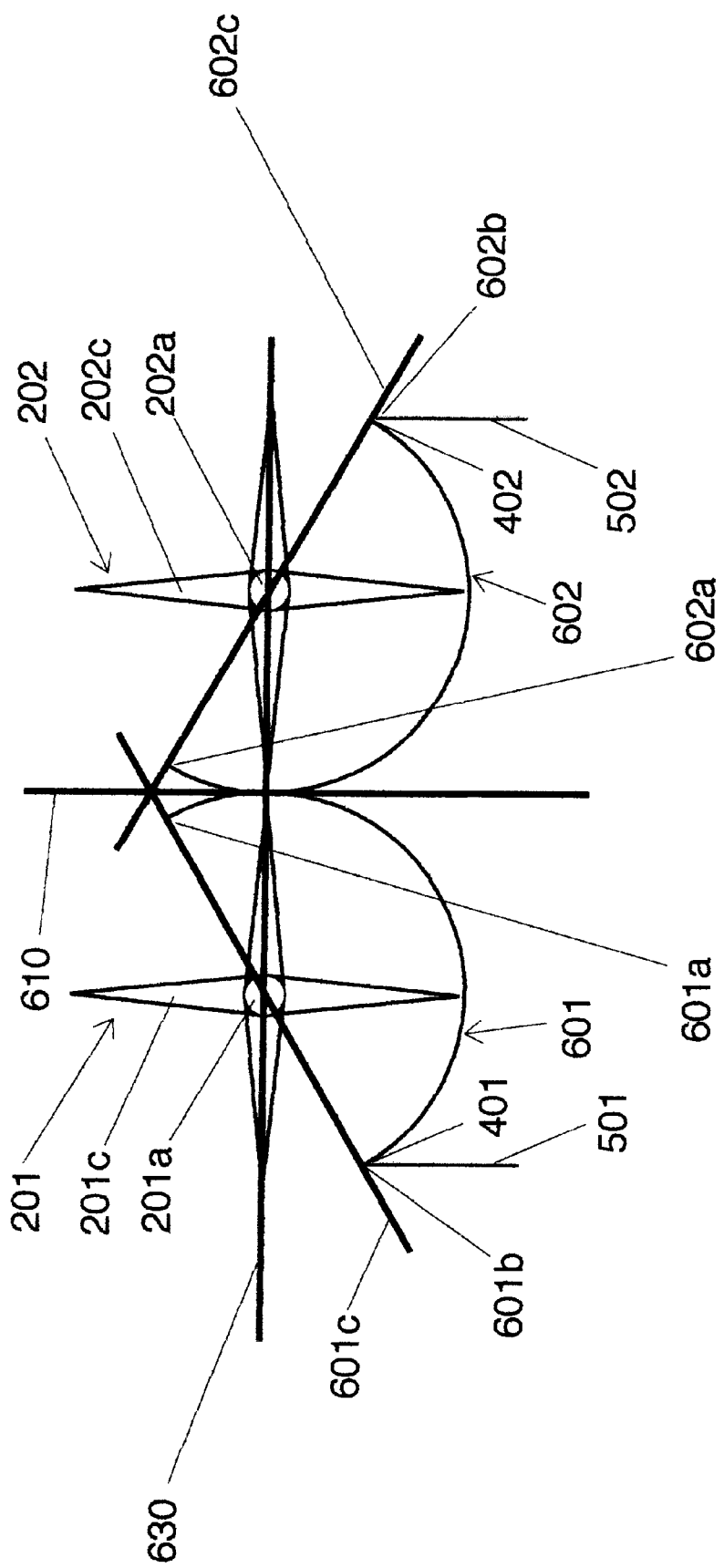
Figure 3:
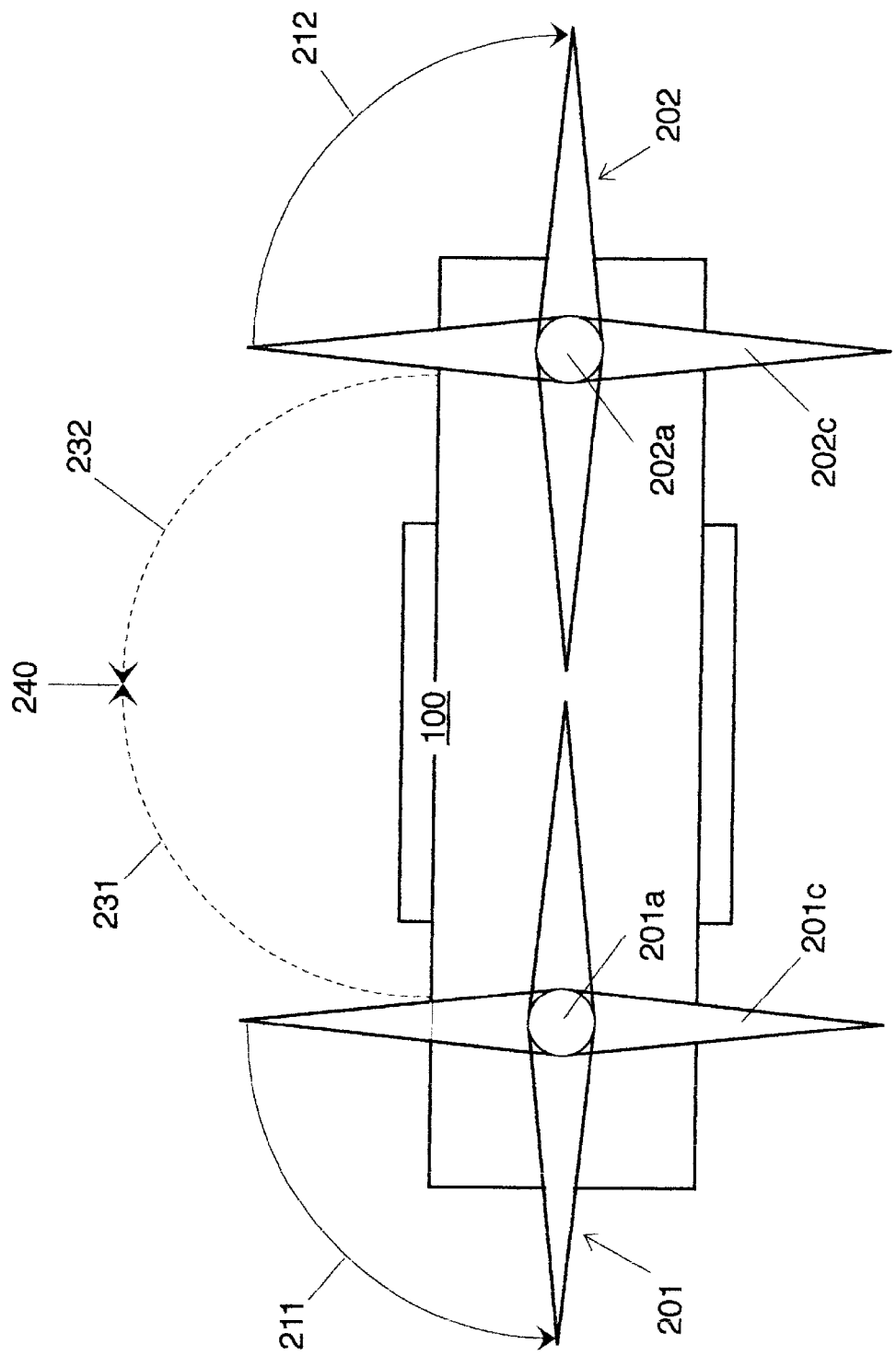

Power plant 100 applies a counter clockwise torque to impeller 201 in Step 110 and applies a clockwise torque to impellers 202 in Step 120 as shown in FIGS. 1 and 3.

Figure 5:
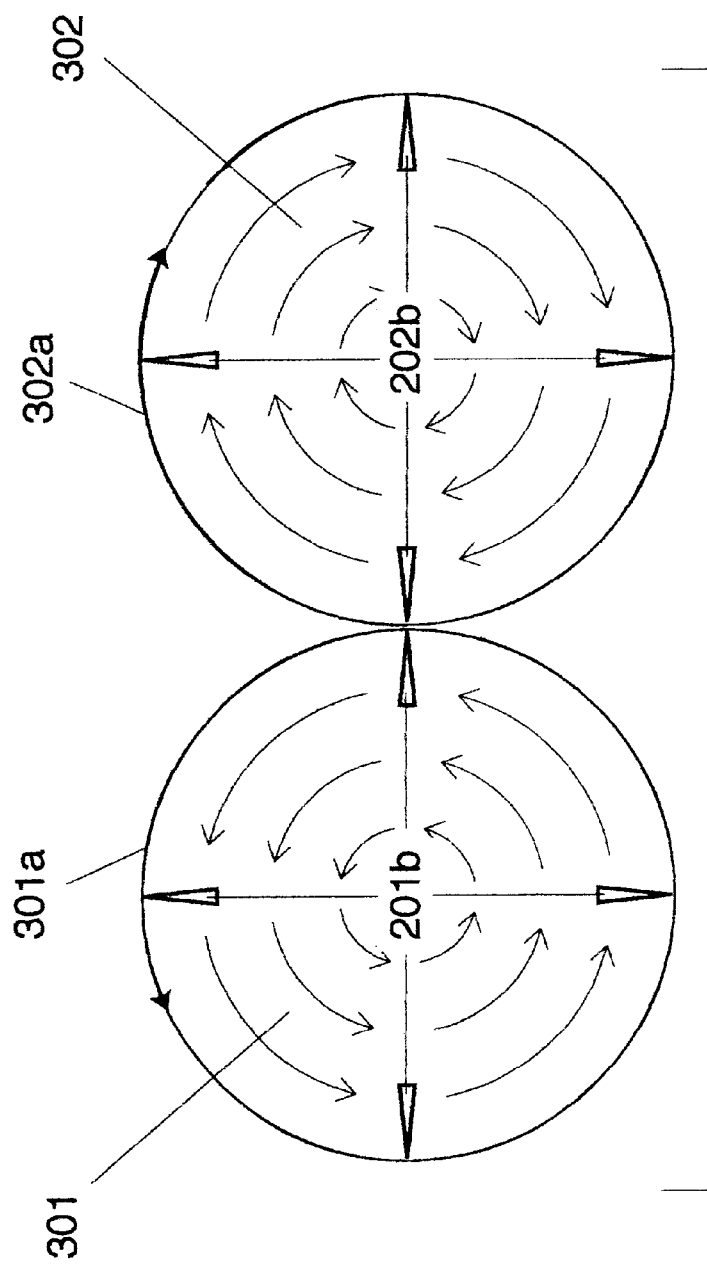

Impeller 201, in Step 211, imparts counterclockwise angular momentum to the volume of air imbedded in the volume swept out by the impeller. That step creates forced vortex 301 and maintains it as shown in FIGS. 1 and 5.

Creating Forced Vortices

Impeller 202, in Step 212, imparts clockwise angular momentum to the volume of air imbedded in the volume swept out by the impeller. That step creates forced vortex 302 and maintains it as shown in FIGS. 1 and 5.

A forced vortex by definition is one in which all the fluid in it has the same angular velocity. That is contrasted with a to a natural vortex in which the angular velocity of the constituent fluid varies as 1/r, where r is the radial distance from the vortex axis.

Forced vortices are created by imparting an angular velocity to the periphery of a body of fluid. Drag soon causes the interior portions of that body of fluid to rotate with the same angular velocity as the exterior portions of that body of fluid.

Figure 4:
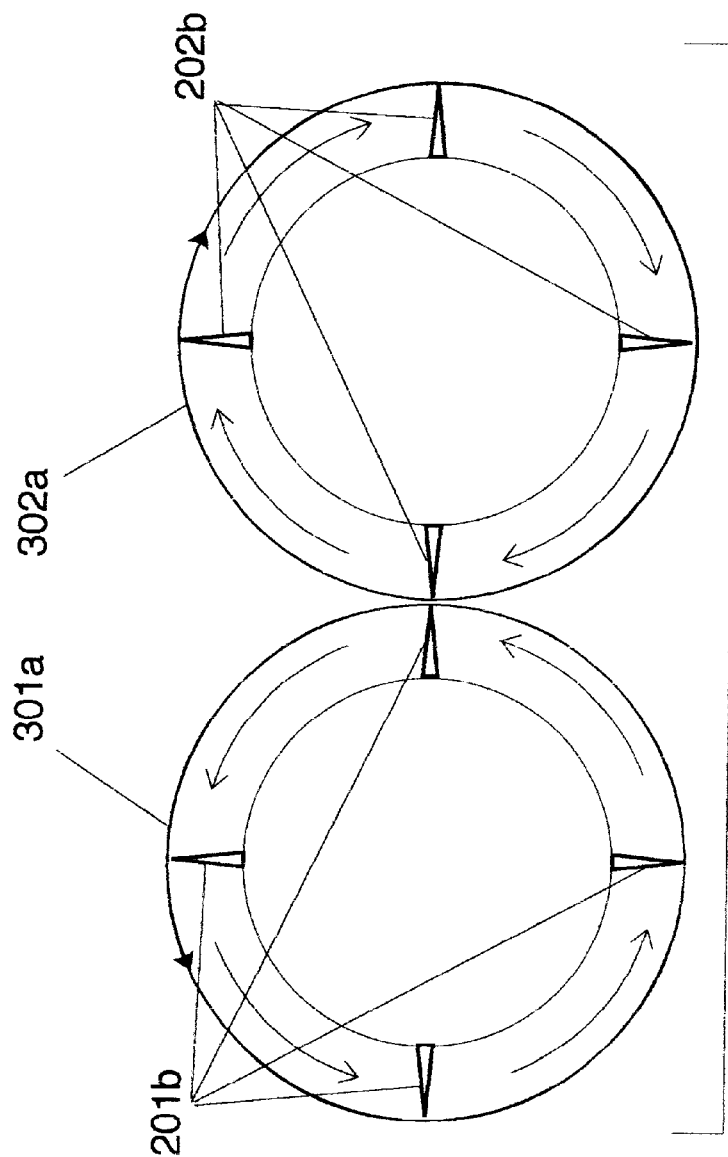

The rotation of impellers, 201 and 202, forces the cylindrical bands of air between the impeller blades of each impeller to rotate with the same angular velocity, on average, as the impeller blades. The volumes air inside those cylindrical bands of air is acted on by drag and rapidly acquires the same angular velocity as those outer volumes as shown in FIGS. 4 and 5.

Figure 8:
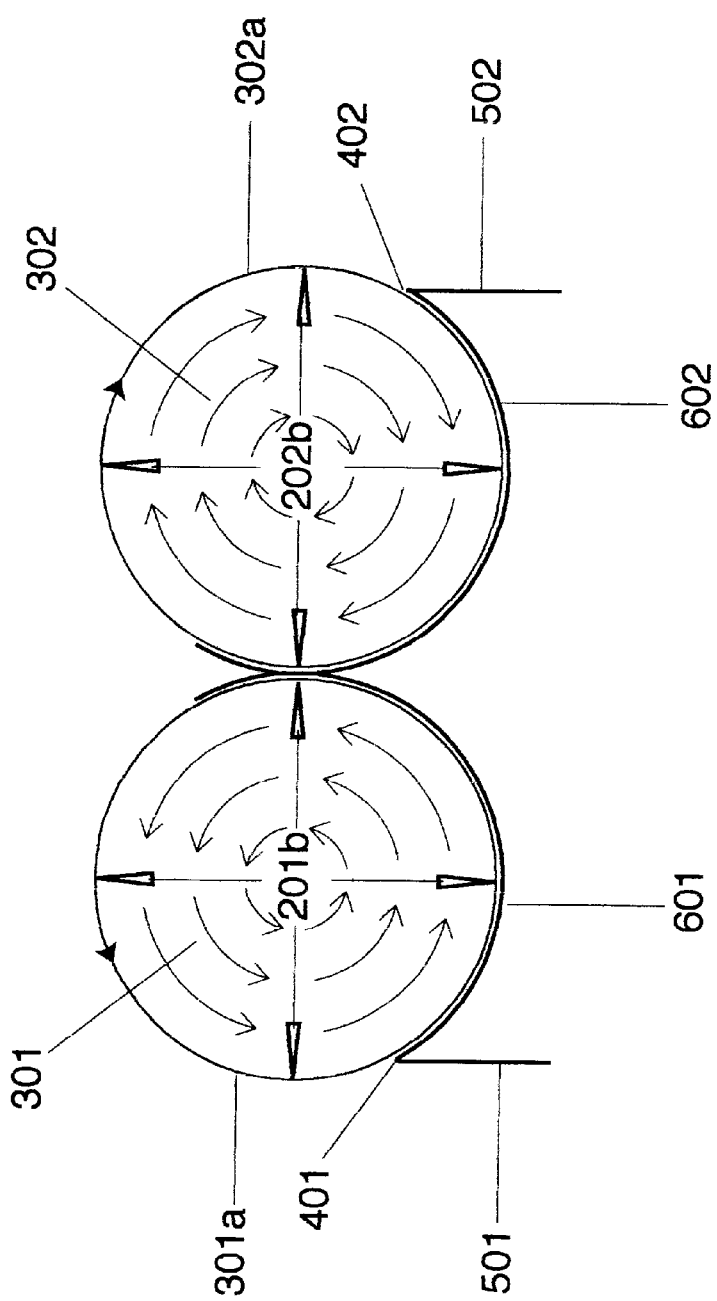

The outer edges of the volume swept out by those impellers is defined as the surfaces of the forced vortices as shown in FIG. 8.

The volumes of air outside the forced vortices are also pulled along by drag. Those volumes behave as though they were a constituents of natural vortices. The velocities of those volumes falls off inversely as their distance from the axis of rotation for the impellers. For example the velocity for those outer volumes at 2 radii from the axis of rotation is ½ velocity of the outer edges of the of the impellers and at 3 radii is ⅓, etc. Where a radius is the distance to the outer edge of the impeller from the axis of the impeller. The velocity profiles of the volumes of air surrounding the forced vortices are shown in FIGS. 18, 19 and 20.

The forced vortices should essentially be side by side and should have axes that are substantially parallel shown in FIG. 5. The axes of the vortices in all end view drawings are perpendicular to the page and thus are parallel to each other. That is true of the impellers also shown in FIGS. 2, 3, 7 and 25 as well as many others.

Cancellation of Reactive Torques

Figure 2:
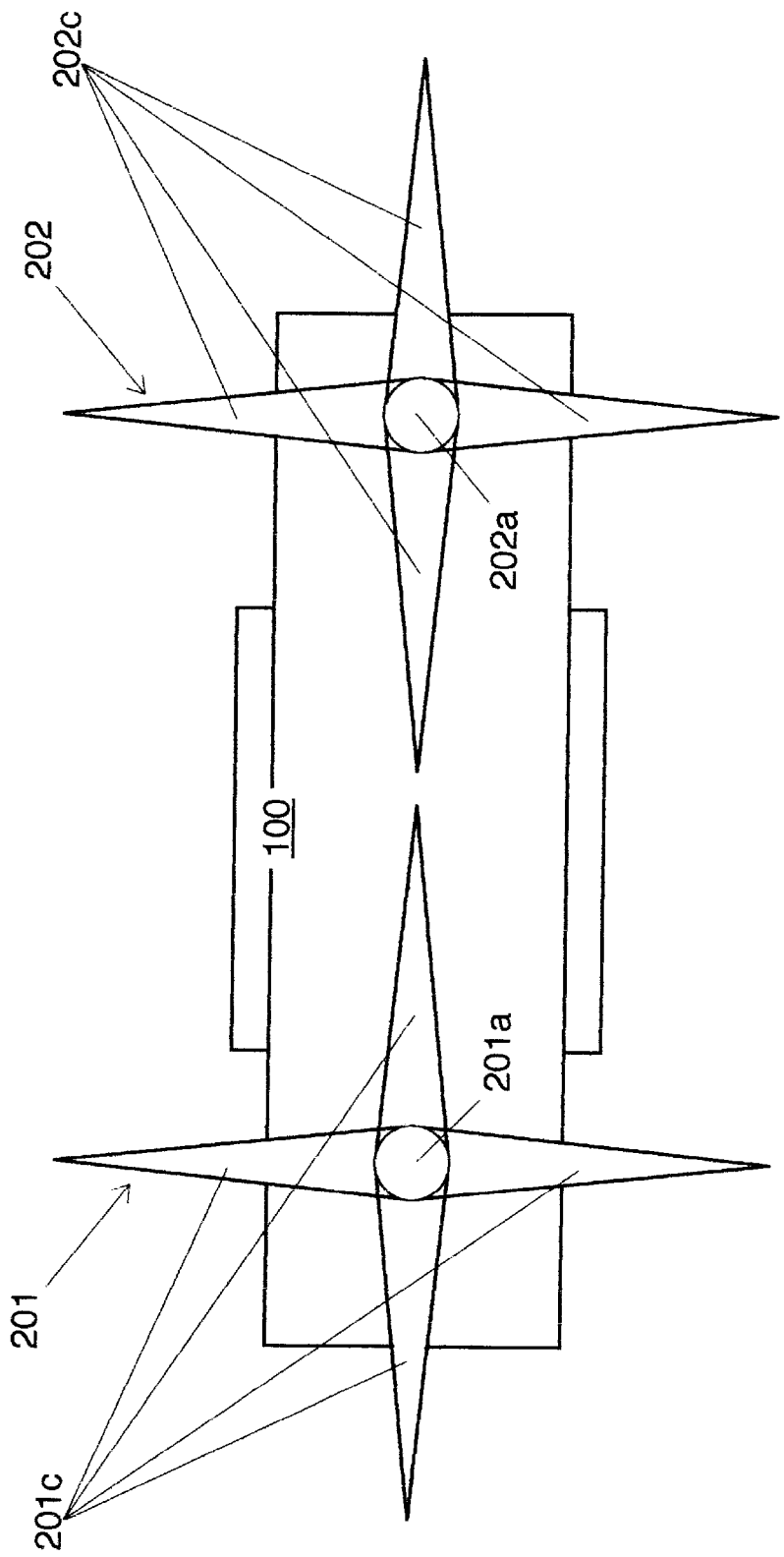

Impeller 201 transmits clockwise reactive torque in Step 221, to power plant 100. Impeller 202 transmits counter clockwise reactive torque in step 222, to power plant 100. Reactive torques transmitted to power plant 100, in Steps 211 and 222, cancel out in Step 230 as shown in FIG. 2.

The forced vortices have essentially identical properties except for rotational directions, which are opposite as shown in FIG. 5 and others.

Sealing Ends of Forced Vortices

Figure 10:
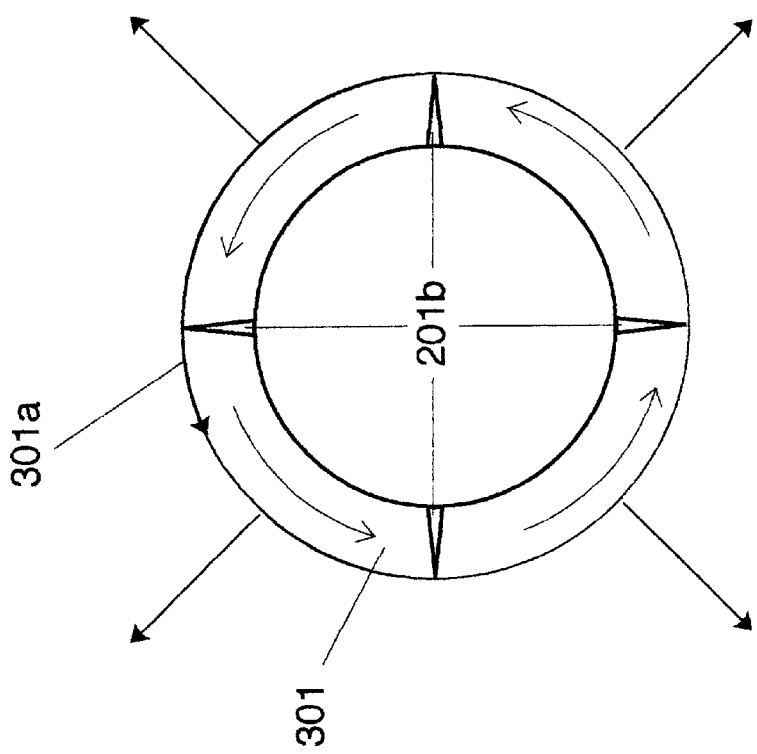
Figure 11:
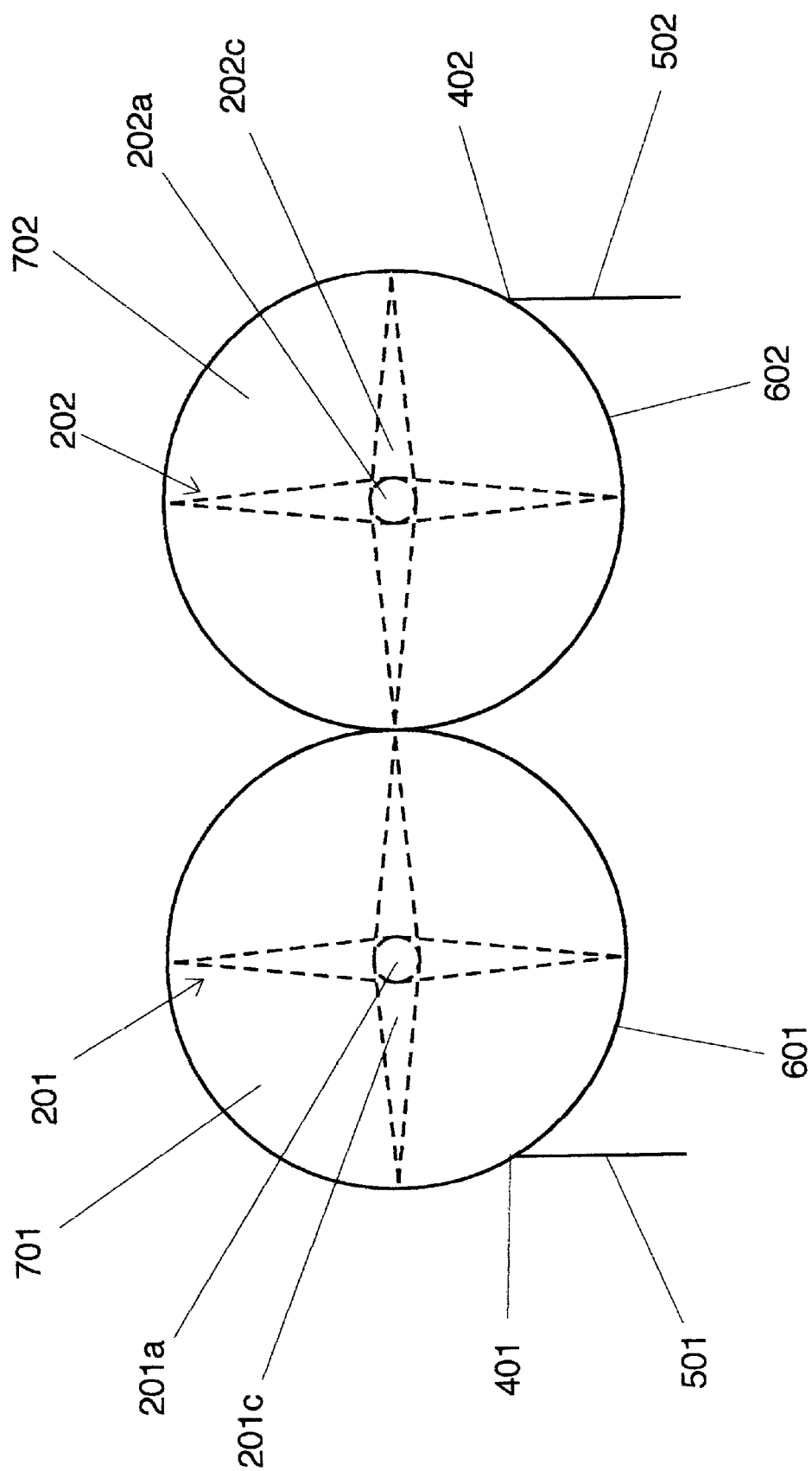

The left vortex seals, 701 and 703, seal both ends of forced vortex 301 to create a partial vacuum in Step 711. Likewise the right vortex seals, 702 and 704, seal both ends of forced vortex 302 to create a partial vacuum in Step 712. FIG. 14 shows Step 712 for the right forced vortex 302 only while FIG. 11 shows the sealing the front sides of both vortices. The maintenance of the partial vacuum in the vortices keeps the centrifugal forces from pulling them apart as shown in FIG. 10.

Energy spent in moving air radially outward is wasted. Only air moving tangentially to the forced vortex surfaces contributes to the development of lift.

Imparting Downward Momentum to Surrounding Air

Figure 9:
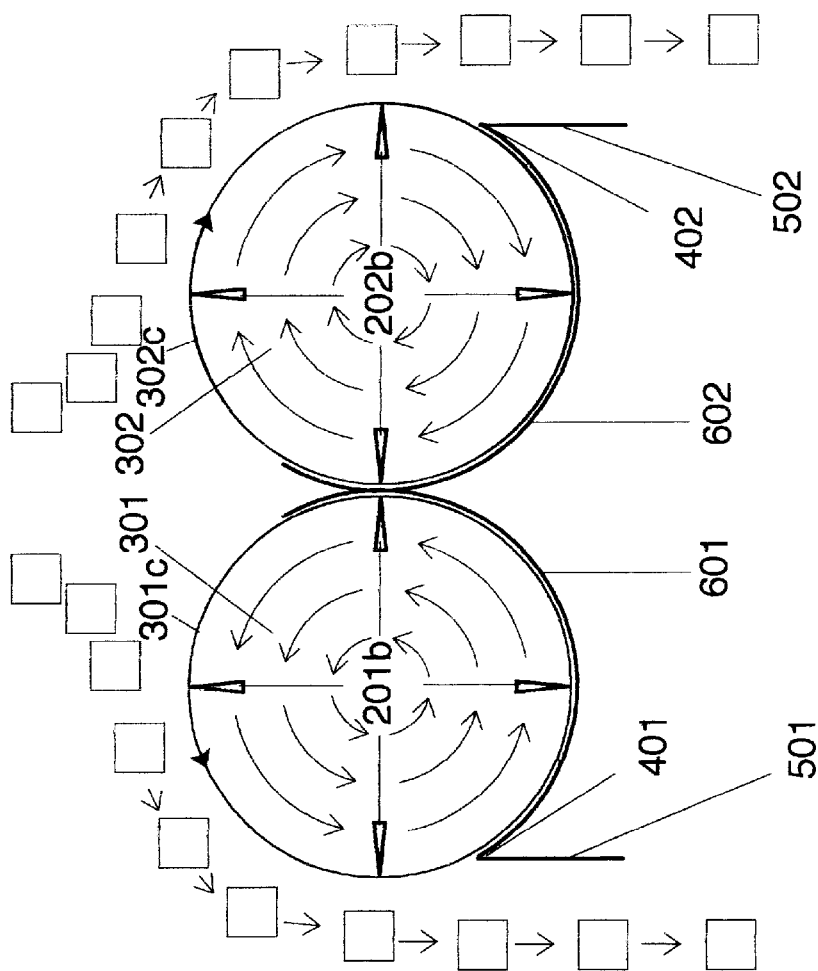

The forced vortex 301 in Step 311 and forced vortex 302, in Step 312, entrain and accelerate masses of air near their surfaces downward shown in FIGS. 9 and 18.

Soon after air entrained by forced vortices 301 and 302 has gained downward momentum it reaches the air knives 401 and 402. There most of the entrained air separates from the surfaces of the forced vortices, 301 and 302, in Steps 411 and 412 as shown in FIG. 18.

Once air with downward momentum separates from the surfaces of the forced vortices by the action of the air knives, 401 and 402, and air guides, 501 and 502, it moves away from the under sides of the lifting surfaces, 602 and 602, and is ejected from the vicinity of the load couplers as shown in FIG. 18.

After most of the entrained air separates from the surfaces of forced vortices 301 and 302, the remaining entrained air around the forced vortex surfaces immediately rotates into contact with the upper surfaces of the lifting surfaces, 601 and 602, in Steps 611 and 612 as shown in FIG. 18.

Generating Lift with the Bernoulli Effect

Steps, 611 and 612, bring the high velocity low pressure air of the forced vortices, 301 and 302, into contact with the upper surfaces of the lifting surfaces, 601 and 602. The lower surfaces of the lifting surfaces, 601 and 602, are in contact with low velocity high pressure air. That air is protected from the high velocity air stream severed from the surfaces of the forced vortices by the air guides, 501 and 502, as shown in FIG. 18. The pressure differentials that exist between upper sides of the load couplers and the lower sides of the lifting surfaces exerts lifting forces on those surfaces. That lifting force transmits to the payload in Steps 621 and 622 by lifting surfaces, 601 and 602, as shown in FIGS. 19, 20, and 21.

Reducing Coefficients of Drag for the Protectede Surfaces of the Forced Vortices In Steps 631, 632, the air near the surfaces of forced vortices is made turbulent by rotating into contact with roughened upper sides of the lifting surfaces, lowering coefficients of friction or drag between the lifting surfaces and the of forced vortices, 301 and 302, as shown in FIG. 15.

Protecting Upward Driving Surfaces from Surrounding Air Masses

In Steps 641 and 642, upward driving surfaces of forced vortices are protected by lifting surfaces, 601 and 602, to prevent substantial upward acceleration of surrounding air masses as shown in FIG. 17.

Raising the Coefficients of Drag for Exposed Surfaces of the Forced Vortices

Raising the coefficients of drag or friction for surfaces of forced vortices, 301 and 302, helps them accelerate surrounding air masses once those surfaces drive downward again. That is the purpose of the next three Steps. In Step 711 and 712, air pumps, 701 and 702, pull air out of the vortices 301 and 302. FIG. 14 shows Steps 712 for forced vortex 302. That causes the chaotic air on the surfaces of the forced vortices to be drawn inward, in Steps 721 and 722, as shown in FIG. 16. As chaotic air is drawn inward, in Steps 721 and 722, laminar air replaces it from just outside the volumes swept out by the impellers, 201 and 202, in Steps 731 and 732 also shown in FIG. 16. Laminar air is more viscous than turbulent air.

It is not necessary for the description of the invention to mention that air is accelerated downward. The description of the lift generating process can be couched entirely in terms of the Bernoulli Effect with out referring to Newton's Laws of Motion. Any aircraft that produces lift by the Bernoulli Effect also acellerates air downward. The volume of air acellerated downward gives a good indication of the efficiency of the lifting process that is the subject this invention.

All of the steps listed in the process that is this invention take place simultaneously and continuously as long as the impellers rotate.

Summary, Ramifications and Scope

Nature produces vortices that have air velocities that reach 200 miles per hour. Those vortices produce pressure differentials 1.5 pounds per square inch as a result of those velocities. That is more than 200 pounds per square foot.

If the impellers in the process that is the subject of this invention were three feet in diameter and had an angular velocity of 1868 revolutions per minute, the surfaces of the forced vortices embedded them would have surface velocities of 200 miles per hour. The air within and the air without but near to the forced vortex surfaces would be at 9/10 of an atmosphere. Such vortices in contact with the upper sides of the lifting surfaces would produce lift factors of approximately 1.5 pounds per square inch or 200 pounds per square foot, assuming that the process were taking place at sea level and that air in contact with the lower side of the load couplers was at sea level atmospheric pressure. These figures are for a craft that is hovering.

The figures would be little changed, for the same craft in motion because the relative speeds of air between the upper and lower sides of the lifting surfaces still differs by the same amount.

Such performance allows a craft using the process of this invention to easily meet the objectives outlined earlier. Furthermore, the process that is the subject of this invention has the additional advantages in that it allows craft designed around it:

a) to hover and yet not produce any adverse torques when in forward flight b) to have better control over the amount of lift being produced c) to be safer for bystanders on the ground d) to land i tighter confines e) to be more efficient at high velocities than aircraft that use the air foil to generate lift.

FIGS. 30 and 31 clearly illustrate the design advantages that this invention confers on aircraft that employ it. The lifting surfaces don't jut into the passing airstream to create drag. They are compact and they operate while the craft is standing still.

The fact that the vortices generated by the lifting process that is the subject of this invention produce a downward movement of air that is, in theory, infinite in extent indicates that the lifting process is very efficient.

Although the description above contains many specificities, these should not be construed as limiting the scope of the invention but as merely providing illustrations of some of the preferred embodiments of this invention.

Thus, the scope of the invention should be determined by the appended claims and their legal equivalents, rather than by examples; given.

What is claimed is:

1. A lift producing apparatus comprising:

(a) a pair of side by side, hollow, cylindrical impellers, each said impeller having a drive shaft, a center line, a diameter and a plurality of impeller blades, said impeller blades having outer edges, longitudinal axes that are substantially parallel to said impeller center line and having transversal axes substantially perpendicular to and thus substantially radial to said impeller center line, said plurality of impeller blades are symmetrically and evenly distributed and attached by fixed means to said drive shaft at a predetermined distance from said center line, said pair of impellers having a left impeller and a right impeller, said center lines of impellers defining a plane of center lines, a volume of space between said left impeller center line and said right impeller center line, a bilateral plane of symmetry bisecting said space between impeller center lines, (b) a pair of side by side, circular, coplanar, planar, front vortex seals, each of said front vortex seals having a lower edge an inner surface, an outer surface, an inner surface, a center line, and a diameter that is slightly larger than said diameters of impellers, said pair of vortex seals having a left front vortex seal and a right front vortex seal, said left front vortex seal is perpendicularly attached at the intersection of said inner surface and said center line of left front vortex seal to left impeller by rotatable means, said right front vortex seal is perpendicularly attached at the intersection of said inner surface and said center line of right front vortex seal to right impeller by rotatable means, (c) a pair of side by side, hollow semicylindrical lifting surfaces each having a substantially semicircular cross section, a center line, a roughened upper surface facing substantially upward, toward said plane of center lines, a lower surface facing substantially downward, away from said plane of center lines, a proximal edge facing toward said bilateral plane of symmetry and a distal edge facing away from said bilateral plane of symmetry, said pair of lifting surfaces having a left lifting surface and a right lifting surface, said center line of left lifting surface aligned colinearly with said center line of left impeller, said center line of right lifting surface aligned colinearly with said center line of right impeller, said proximal edge and distal edge of said left lifting surface defining a left dihedral plane, said left dihedral plane subtending an acute counter clockwise angle with said plane of center lines, said acute angle defined as left dihedral angle, said proximal edge and distal edge of said right lifting surface defining a right dihedral plane, said right dihedral plane subtending an acute clockwise angle with said plane of center lines, said acute angle defined as right dihedral angle, said left dihedral angle and said right dihedral angle having substantially equal magnitudes and opposite angular directions, said left lifting surface attached by fixed airtight means to said lower edge of left front vortex seal, said right lifting surface attached by fixed airtight means to said lower edge of right front vortex seal, (d) a pair of air guides that are planar and elongated having and upper edge and a lower edge, said pair of air guides having a left air guide and a right air guide, said upper edge of left air guide is attached by fixed means to said distal edges of left lifting surface, said lower edge of left air guide is aligned in a direction from said upper edge of left air guide that is simultaneously parallel to said bilateral plane of symmetry and opposed to and perpendicular to said plane of center lines, said lower edge of right air guide is aligned in a direction from said upper edge of right air guide that is simultaneously parallel to said bilateral plane of symmetry and opposed to and perpendicular to said plane of center lines, (e) a pair of air knives formed by the junction of said air guides to said lifting surfaces, said pair of air knives having a left air knife and having a right air knife, (f) a pair of side by side, coplanar, circular, planar, rear vortex seals each having an outer edge, an inner surface and outer surface, a center line, a lower edge relative to said reference plane, a circular hole concentric to said outer edge of rear vortex seal, said pair of rear vortex seals having a left rear vortex seal and a right rear vortex seal, said left rear vortex seal oriented perpendicularly relative to said impeller center line and attached by fixed air tight means to said left lifting surface with said inner surface of left lifting surface facing toward said inner surface of left front vortex seal and said left impeller drive shaft extending along its center line through said circular hole past said outer surface of left rear vortex seal, said right vortex seal oriented perpendicularly relative to said impeller center line and attached by fixed air tight means to said right lifting surface with said inner surface of right rear vortex seal facing toward said inner surface of right front vortex seal and said right impeller drive shaft extending along its center line through said circular hole past said outer surface of right rear vortex seal, (g) a pair of side by side air pumps each having an inlet with a center line, said pair of air evacuators having a left air evacuator and a right air evacuator, said left air pump attached by fixed air tight means to the outer surface surrounding said circular hole in left rear vortex seal, said right air pump attached by fixed air tight means to the outer surface regions surrounding said circular hole in right rear vortex seal, (h) a power plant attached by transmissive means to said left impeller and said right impeller, and attached by transmissive means to said left air evacuator and to said right air evacuator.

2. A method of generating a lifting force by way of the Bernoulli Effect comprising the steps of:

(a) transmitting counter clockwise torque from said power plant to said left impeller causing said left impeller to rotate in a counter clockwise direction, (b) transmitting clockwise torque from said power plant to said right impeller causing said right impeller to rotate in a clockwise direction, (c) forcing the layer of air embedded between said left impeller blades to rotate with same angular velocity as said left impeller and dragging along the volume of air inside said hollow left impeller and causing said volume of air in said hollow impeller to also rotate with the same said angular velocity as said left impeller to create left forced vortex, said left forced vortex having a surface swept out said outer edges impeller blades during said rotation of said left impeller, said left forced vortex having a lower surface, an upper surface, a front end, a rear end, an axis of rotation, a core, an upward driving surface and downward driving surface, said surface of left forced vortex having a high predetermined tangential velocity, (d) forcing the layer of air embedded between said right impeller blades to rotate with same angular velocity as said right impeller and dragging along the volume of air inside said hollow right impeller and causing said volume of air in said hollow impeller to also rotate with the same said angular velocity as said right impeller to create right forced vortex, said right forced vortex having a surface swept out said outer edges impeller blades during said rotation of said right impeller, said right forced vortex having a lower surface, an upper surface, a front end, a rear end, an axis of rotation, a core, an upward driving surface and downward driving surface, said surface of left forced vortex having a high predetermined tangential velocity, (e) reducing the pressure of air in said left forced vortex and volumes of air surrounding said left forced vortex via said Bernoulli Effect, creating said Bernoulli Effect by rotating said left forced vortex surfaces past said volumes of air surrounding said forced vortex surfaces, (f) reducing the pressure of air in said right forced vortex and volumes of air surrounding said right forced vortex via said Bernoulli Effect, creating said Bernoulli Effect by rotating said right forced vortex surfaces past said volumes of air surrounding said forced vortex surfaces, (g) sealing ends of said left forced vortex by blocking an inflow high pressure low velocity into said core of said left forced vortex with said front and rear left vortex seals, (h) sealing ends of said right forced vortex by blocking an inflow high pressure low velocity into said core of said right forced vortex with said front and rear right vortex seals, (i) canceling reactive torques generated by creation and maintenance of said left and right forced vortices at said power plant, (j) accelerating air that is in contact with said downward moving surface of left forced vortex in a downward direction, (k) accelerating air in contact with said downward moving surface of right forced vortex in a downward direction, (l) severing said accelerated air from the periphery of said left forced vortex with said left air knife, (k) severing said accelerated air from the periphery of said right forced vortex with said right air knife, (m) guiding previously said accelerated air downward and away from said lower side of said left lifting surface, (n) guiding previously said accelerated air downward and away from said lower side of said right lifting surface, (o) generating said lifting force on said left lifting surface by bringing said low pressure high velocity air surrounding said left forced vortex surface into contact with said upper surface of left lifting surface and exposing said lower side of lifting surface to lower velocity higher pressure air protected by said left air guide, (p) generating said lifting force on said right lifting surface by bringing said low pressure high velocity air surrounding said right forced vortex surface into contact with said upper surface of right lifting surface and exposing said lower surface of lifting surface to lower velocity higher pressure air protected by said right air guide, (q) protecting said upward driving surfaces of left forced vortex to prevent substantial upward acceleration of said surrounding volumes of air around said left forced vortex, (r) protecting said upward driving surfaces of right forced vortex to prevent substantial upward acceleration of said surrounding volumes of air around said right forced vortex.

3. A method as forth in claim 2 further including, (a) making turbulent said surface left of forced vortex and said surrounding volues of air by rotating said left forced vortex and said surrounding volumes of air past roughened surface of left lifting surface, (b) making turbulent said surface right of forced vortex and said surrounding volumes of air by rotating said right forced vortex and said surrounding volues of air past roughened surface of right lifting surface.

4. A method as set forth in claim 2 further including,
(a) pumping air out of said core of left forced vortex with said left air evacuator,
(b) pumping air out of said core of right forced vortex with said right air evacuator,
(c) replacing said chaotic surface air of said left vortex drawn inward by evacuation of air out of said core of left forced vortex with more laminar air outside of said left forced vortex surface,
(d) replacing said chaotic surface air of said right vortex drawn inward by evacuation of air out of said core of right forced vortex with more laminar air outside of said right forced vortex surface.

* * * * *